(12) United States Patent
Tanaka

(10) Patent No.: US 7,747,991 B2
(45) Date of Patent: Jun. 29, 2010

(54) PROGRAM CONVERTING METHOD

(75) Inventor: Hirohisa Tanaka, Suita (JP)

(73) Assignee: Panasonic Corporation, Osaka (JP)

( * ) Notice: Subject to any disclaimer, the term of this patent is extended or adjusted under 35 U.S.C. 154(b) by 1239 days.

(21) Appl. No.: 11/271,801

(22) Filed: Nov. 14, 2005

(65) Prior Publication Data
US 2006/0130014 A1    Jun. 15, 2006

(30) Foreign Application Priority Data
Nov. 19, 2004  (JP) ............................. 2004-336539

(51) Int. Cl.
*G06F 9/45* (2006.01)
(52) U.S. Cl. .................. 717/152; 717/154; 717/136; 717/142; 717/165
(58) Field of Classification Search ............... 717/141, 717/136, 142, 152, 154, 165
See application file for complete search history.

(56) References Cited

U.S. PATENT DOCUMENTS

| | | | | |
|---|---|---|---|---|
| 6,041,179 | A * | 3/2000 | Bacon et al. ............... | 717/116 |
| 6,463,581 | B1 * | 10/2002 | Bacon et al. ............... | 717/154 |
| 6,546,551 | B1 * | 4/2003 | Sweeney et al. ........... | 717/154 |
| 6,675,377 | B1 * | 1/2004 | Tanaka ....................... | 717/152 |
| 6,760,902 | B1 * | 7/2004 | Ott ............................. | 717/113 |
| 6,760,907 | B2 | 7/2004 | Shaylor | |
| 7,103,878 | B2 * | 9/2006 | Fahs et al. .................. | 717/130 |
| 7,661,098 | B2 * | 2/2010 | Sheikh et al. .............. | 717/151 |

FOREIGN PATENT DOCUMENTS

| | | |
|---|---|---|
| JP | 10-320204 | 12/1998 |
| JP | 2000-040007 | 2/2000 |

OTHER PUBLICATIONS

English Language Abstract of JP 2000-040007.
English Language Abstract of JP 10-320204.

* cited by examiner

*Primary Examiner*—Hyung S Sough
*Assistant Examiner*—Kimberly Jordan
(74) *Attorney, Agent, or Firm*—Greenblum & Bernstein, P.L.C.

(57) ABSTRACT

Noting that there is a case where a type of a pointer "this" in a member function can be specified, the present invention provides a program converting method in which a virtual function call can be converted into a direct function call, and by which improvement of execution performance as well as reduction of a code size of a program can be achieved. The program converting method is a method for converting a program described in an object-oriented language, including: analyzing, in the program, a type of an instance by which a method is called; extracting, from a definition of the method, a virtual method call which is called by the instance; and converting, based on the type of the instance analyzed by the analyzing, the virtual method call extracted by the extracting, into a direct method call.

11 Claims, 48 Drawing Sheets

FIG. 1

```
class A {
    virtual void f(int)
    virtual void g(int)
    virtual void h(int)
}
class B : public A {
    void g(int)
}
B obj_b;
void t1(void)
{
    t2(&obj_b)
}
void t2(A* p)
{
    p->g(10);    // Virtual Function Call
}
```

Virtual Function Call

```
mov    (R0,offset1), R2
mov    (R2,offset2), R2
mov    10, R1
call   (R2)
```

Direct Function Call

```
mov    10, R1
call   _g__A
```

FIG. 5

```
class A {
    virtual void f(void)
    virtual void g(void)
}
class B : public A {
    void f(void)
}
class C : public B {
    void g(void)
}
class D : public B {
    void f(void)
    void g(void)
}
void h(A* p)          ←——— (A)
{
    p->f()
}
void A::f(void)       ←——— (B)
{
    this->g()
}
```

FIG. 6

```
void h(A* p)
{
    Obtain Virtual Function Address
    if (Virtual Function Address is A::f)
    {
        p->A::f();    // Direct Call to A::f
    } else {
        p->f();       // Virtual Function Call
    }
}
```

FIG. 7

·When there is no Derived Class of Class A

```
void h(A* p)
{
    p->A::f();    // Direct Call to A::f
}
```

·When there is Derived Class of Class A

```
void h(A* p)
{
    p->f();    // Virtual Function Call
}
```

FIG. 8

```
void A::f(void)
{
    Obtain Virtual Function Address
    if (Virtual Function Address is A::g)
    {
        this->A::g();    // Direct Call to A::g
    } else {
        this->g();       // Virtual Function Call
    }
}
```

FIG. 13

```
                                              ┌─ 111
class A {
    virtual void f(void)
    virtual void g(void)
    virtual void h(void)
}
class B : public A {
    void f(void)
    void g(void)
}
class C : public B {

}
class D : public B {
    void g(void)
    void h(void)
}
void A::f(void)
{
    this->g()
}
void B::g(void)
{
    this->h()
}
void t(void)
{
    C obj_c
    obj_c.g()
}
```

FIG. 16

| | | 114 |
|---|---|---|
| A | f(void) | OFF |
| A | g(void) | OFF |
| A | h(void) | OFF |
| B | f(void) | ON |
| B | g(void) | ON |
| B | h(void) | OFF |
| C | f(void) | OFF |
| C | g(void) | OFF |
| C | h(void) | OFF |
| D | f(void) | OFF |
| D | g(void) | ON |
| D | h(void) | ON |

FIG. 20

```
void A::f(void)
{
    this->A::g();      // Direct Call to A::g
}
```

FIG. 22
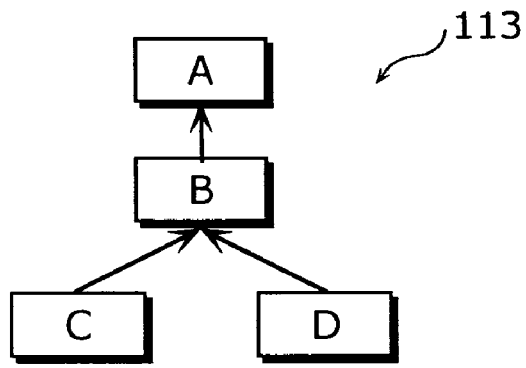
FIG. 23
| A | f(void) | OFF | 114 |
| A | g(void) | OFF | |
| A | h(void) | OFF | |
| B | f(void) | ON | |
| B | g(void) | ON | |
| B | h(void) | OFF | |
| C | f(void) | OFF | |
| C | g(void) | OFF | |
| C | h(void) | OFF | |
| D | f(void) | OFF | |
| D | g(void) | ON | |
| D | h(void) | ON | |
FIG. 24
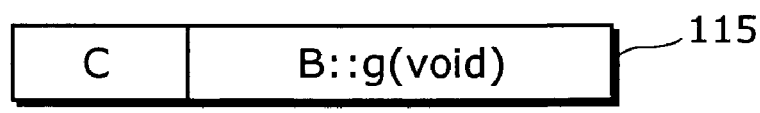

FIG. 26

```
void A::f(void)
{
    this->A::g();      // Direct Call to A::g
}
void B::g(void)
{
    this->B::h();      // Direct Call to B::h
}
```

FIG. 30

```
class A {
    virtual void f(void)
    virtual void g(void)
    virtual void h(void)
}
class B : public A {
    void g(void)
}
class C : public B {

}
class D : public B {
    void h(void)
}
void A::f(void)
{
    this->g()
}
void B::g(void)
{
    this->h()
}
void t(void)
{
    C obj_c
    obj_c.g()
}
```
_111

FIG. 31
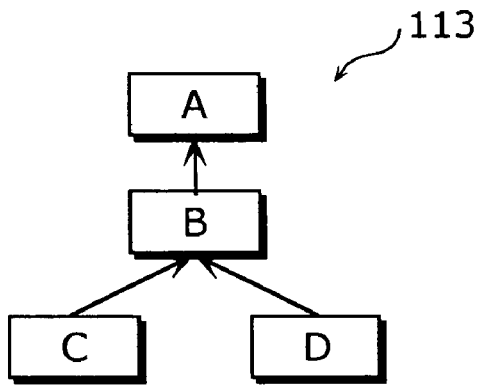
FIG. 32
| | | 114 |
|---|---|---|
| A | f(void) | OFF |
| A | g(void) | OFF |
| A | h(void) | OFF |
| B | f(void) | OFF |
| B | g(void) | ON |
| B | h(void) | OFF |
| C | f(void) | OFF |
| C | g(void) | OFF |
| C | h(void) | OFF |
| D | f(void) | OFF |
| D | g(void) | OFF |
| D | h(void) | ON |
FIG. 33
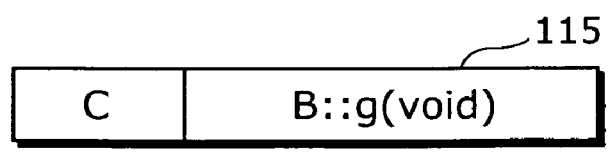

FIG. 37

```
class A {
    virtual void f(void)
    virtual void g(void)
    virtual void h(void)
}
class B : public A {
    void f'(void)
    void g(void)
    void h'(void)
}
class C : public B {
    void f'(void)
    void g'(void)
    void h'(void)
}
class D : public B {
    void f'(void)
    void g'(void)
    void h(void)
}
```

FIG. 38 vtbl_A

| A::f(void) |
|---|
| A::g(void) |
| A::h(void) | vtbl_B

| B::f'(void) |
|---|
| B::g(void) |
| B::h'(void) | vtbl_C

| C::f'(void) |
|---|
| C::g'(void) |
| C::h'(void) | vtbl_D

| D::f'(void) |
|---|
| D::g'(void) |
| D::h(void) |

```
void A::f(void)
{
    this->A::g();    // Direct Call to A::g
}
```

FIG. 42
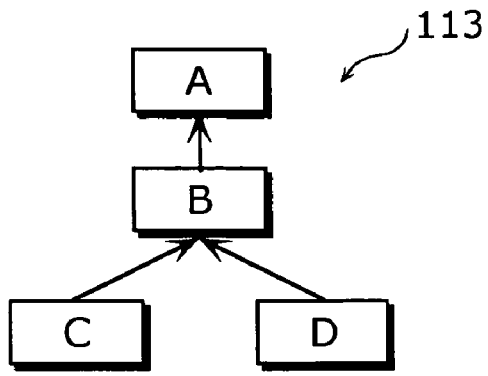
FIG. 43
| A | f(void) | OFF |
|---|---------|-----|
| A | g(void) | OFF |
| A | h(void) | OFF |
| B | f(void) | OFF |
| B | g(void) | ON |
| B | h(void) | OFF |
| C | f(void) | OFF |
| C | g(void) | OFF |
| C | h(void) | OFF |
| D | f(void) | OFF |
| D | g(void) | OFF |
| D | h(void) | ON |
114
FIG. 44
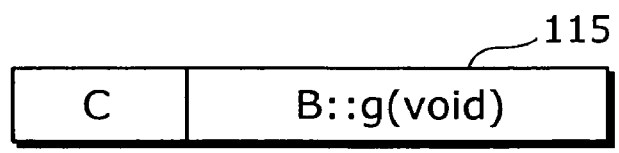

FIG. 49

```
class A {
    virtual void f(void)
    virtual void g(void)
    virtual void h(void)
}
class B : public A {
    void f'(void)
    void g(void)
}
class C : public B {

}
class D : public B {
    void h(void)
}
```

FIG. 50 vtbl_A

| A::f(void) |
| A::g(void) |
| A::h(void) | vtbl_B

| B::f'(void) |
| B::g(void) |
| A::h(void) | vtbl_C

| B::f'(void) |
| B::g(void) |
| A::h(void) | vtbl_D

| B::f'(void) |
| B::g(void) |
| D::h(void) |

FIG. 51

```
void A::f(void)
{
    this->A::g();    // Direct Call to A::g
}
```

FIG. 53
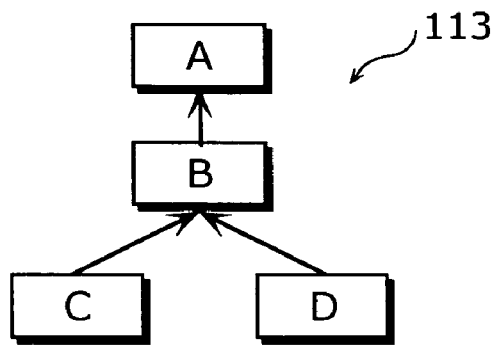
FIG. 54
| A | f(void) | OFF |
|---|---------|-----|
| A | g(void) | OFF |
| A | h(void) | OFF |
| B | f(void) | OFF |
| B | g(void) | ON |
| B | h(void) | OFF |
| C | f(void) | OFF |
| C | g(void) | OFF |
| C | h(void) | OFF |
| D | f(void) | OFF |
| D | g(void) | OFF |
| D | h(void) | ON |
114
FIG. 55
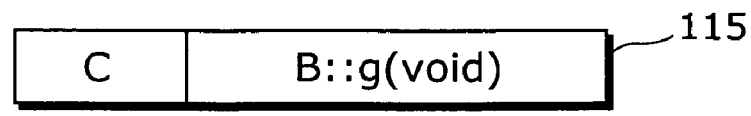

| S1:this->g() |
| S2:this->h() |

116

| B | A::f(void) |
|---|---|
| D | B::g(void) |

FIG. 59

```
class A {
    virtual void f(void)
    virtual void g(void)
    virtual void h(void)
}
class B : public A {
    void f'(void)
    void g(void)
}
class C : public B {

}
class D : public B {
    void g'(void)
    void h(void)
}
```

FIG. 60
vtbl_A
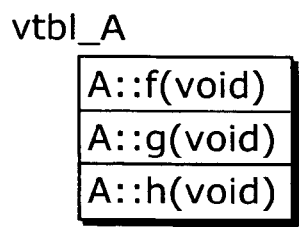
vtbl_B
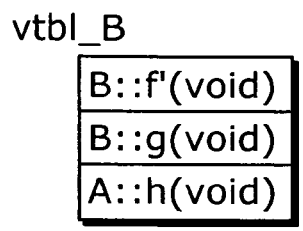
vtbl_C
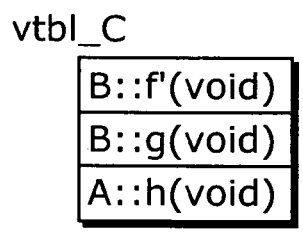
vtbl_D
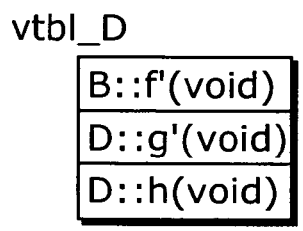
FIG. 61
```
void A::f(void)
{
    this->A::g();      // Direct Call to A::g
}
void B::g(void)
{
    this->B::h();      // Direct Call to B::h
}
```

PROGRAM CONVERTING METHOD

BACKGROUND OF THE INVENTION (1) Field of the Invention

The present invention relates to a program converting method for converting a program which is described in an object-oriented language, and more specifically to a program converting method for converting a virtual function call to a direct function call.

(2) Description of the Related Art

In recent years, with size increase of programs, in order to increase development efficiency of the programs and attempt to reuse the programs, or in order to improve serviceability of the programs, developments of programs described in object-oriented languages, such as C++ and JAVA™, have frequently been conducted.

One of characteristics of the object-oriented language is polymorphism. The polymorphism means characteristic in which an operation in the program is dynamically changed depending on a type of an instance of an object during execution of the program.

In order to realize the polymorphism, the C++ language, for example, has a feature which is a virtual function. The virtual function is described in detail below with reference to FIGS. 1 to 4.

FIG. 1 is a program that is described in the object-oriented C++ language. Keywords "virtual" which are designated by declarations of member functions f, g, and h in a class A designate that the member functions f, g, and h are virtual functions. The "virtual function" is a function whose execution is dynamically determined depending on a type of an object which is pointed by a pointer during the execution of the program, and in a case where a virtual function in a base class is re-defined in a derived class, when a pointer points an object in the derived class, a virtual function in the derived class is executed.

A class B inherits the class A, and a member function g in the class B is overridden on the virtual function g in the base class A and executes an operation which is unique to the class B.

Here, if the member function g is called by a pointer variable p in a function t2, the call becomes a virtual function call. Here, if an object which is pointed by the pointer variable p is an object in the class A, the function g in the class A is executed, and on the other hand, if the object is an object in the class B, the function g in the class B is executed. Thus, a function to be executed is determined depending on a type of an object which is pointed by the pointer variable p.

FIG. 2 shows a schematic diagram of a method for realizing the virtual function.

A class-B type object obj_b holds a pointer member vptr which points a virtual function table. The member vptr points a virtual function table vtbl_B of the class B. The virtual function table of the class B holds addresses of all virtual functions which can be called in the class B.

Here, it is assumed that the virtual function g is called by the pointer variable p.

In a case where the pointer variable p points the class-B type object obj_b, the p holds a first address of the obj_13 b. An address of a function to be called by the virtual function call is necessary to be obtained in processing of firstly obtaining the virtual function table and then obtaining the address.

In other words, a value of the pointer variable p is added with an offset 1 to obtain a value of an address, and the obtained value is further added with an offset 2 to obtain a further value of the address, thereby obtaining the address of the function to be called.

Therefore, assembler codes for executing the virtual function call are as shown in FIG. 3. On the other hand, assembler codes for executing a direct call to a function are as shown in FIG. 4. As shown in the figures, the codes for the virtual function call tends to have more number of orders and a lower execution speed compared to the codes for the direct function call.

Therefore, the more the number of the virtual function calls is decreased, the more execution performance of the program is improved.

As conventional technologies for reducing the number of executions of the virtual function calls and improving the execution performance, there are technologies in which an address of a function to be called by the virtual function call is compared with an address of a specific function, and if the function to be called is the specific function, the function is directly called (Japanese Patent Laid-Open No. 2000-40007 publication, for example). Thereby, it is possible to convert the codes selectively by executing codes for directly calling the function when the function to be executed by the virtual function call can be specified, and executing codes for the general virtual function call when the function cannot be specified. FIG. 6 shows a schematic diagram in which a function h indicated by a directional arrow (A) in the program shown in FIG. 5 is converted by a method described in the Japanese Patent Laid-Open No. 2000-40007 publication. Thus, in a case where an address of a virtual function is an address of a member function "A::f" (function f defined in the class A), the function "A::f" is directly called, and in other cases, the virtual function call is performed. Furthermore, by performing inline expansion of the direct call to functions, it is possible to improve the execution performance of the program.

There are further technologies in which inheritance relationship among classes are analyzed, and a virtual function call in classes which do not have any derived classes is converted into a direct function call (Japanese Patent Laid-Open No. 10-320204 publication, for example). Thereby, the virtual function call can be converted into the direct function call during compiling the program, so that it is possible to improve the execution performance of the program. FIG. 7 shows a schematic diagram in which the function h indicated by the directional arrow (A) in the program shown in FIG. is converted by the method described in the Japanese Patent Laid-Open No. 10-320204 publication.

Here, if a class from which a virtual function is called can be specified, it is possible to specify a function to be called by the virtual function call. For example, there is a case that it is possible to specify that the member function f in the class A indicated by a directional arrow (B) of FIG. 5 has only class-A type pointer "this". In such a case, when the virtual function g is called by the pointer "this", a function to be called is always the member function g in the class A. Note that the pointer "this" means a special pointer for pointing, in the member function, an object whose member function is invoked.

However, in the technology described in the Japanese Patent Laid-Open No. 2000-40007 publication, as shown in FIG. 8, even if the class from which the virtual function is called can be specified, there is a problem that the execution performance and a code size of the program are reduced compared to the codes for the direct function call, due to generation of the code for comparing the address of the function.

Further, since a type of the pointer "this" is the class A, in the technology described in the Japanese Patent Laid-Open No. 10-320204 publication, in a case where the class from which the virtual function is called has a derived class, there is a problem that the virtual function call cannot be converted into the direct function call.

SUMMARY OF THE INVENTION

The present invention addresses the above problems, and notes that there is a case where a type of a pointer "this" in a member function can be specified, an object of the present invention is to provide a program converting method by which a virtual function call can be converted into a direct function call, and at the same time improvement of execution performance as well as reduction of a code size of a program can be achieved.

In order to achieve the above object, according to one aspect of the present invention, a program converting method for converting a program described in an object-oriented language includes: analyzing, in the program, a type of an instance by which a method is called; extracting, from a definition of the method, a virtual method call which is called by the instance; and converting, based on the type of the instance analyzed by the analyzing, the virtual method call extracted by the extracting, into a direct method call.

Thereby, the call to the virtual method (virtual function call) can be converted into the direct call to the method (direct function call), so that it is possible to improve the execution performance of the program. It is also possible to reduce the code size in the program.

Furthermore, according to another aspect of the present invention, a program converting method for converting a program described in an object-oriented language includes: analyzing, in the program, a type of an instance by which a method is called; extracting, from a definition of the method, a virtual method call which is called by the instance; and converting, based on the type of the instance analyzed by the analyzing, the virtual method call extracted by the extracting, into a direct method call.

Thereby, by duplicating the virtual method, a possibility of converting the call to the virtual method into the direct call to the method is increased, so that it is possible to further improve the execution performance of the program and also to reduce the code size of the program.

Furthermore, according to still another aspect of the present invention, a program converting method for converting a program described in an object-oriented language includes: compiling the program; and linking a result of the compiling, and wherein the compiling includes: analyzing, in the program, a type of an instance by which a method is called; extracting, from a definition of the method, a virtual method call which is called by the instance; and outputting results of the analyzing and the extracting, and the linking includes: inputting an output of the compiling and extracting an analysis result included the outputs; converting, based on a result of the extracting of the analysis result, the virtual method call into a direct method call; and linking results of the converting to one another.

Thereby, it is possible to achieve the above execution performance of the program in a structure which is different from the above-described program converting method.

Furthermore, according to still another aspect of the present invention, a program converting method for converting a program described in an object-oriented language includes: extracting predetermined information from the program; and converting, based on a result of the extracting, a virtual method call into a direct method call, wherein the extracting includes: analyzing, in the program, a type of an instance by which a method is called; extracting, from a definition of the method, the virtual method call which is called by the instance, and the converting includes: inputting by receiving the program, a result of the analyzing, and a result of the extracting of the definition of the method, as inputs; and converting, based on the results which are inputted by the inputting, the virtual method call extracted by the extracting of the definition of the method, into the direct method call.

Thereby, it is possible to achieve the above execution performance of the program in a structure which is different from the above-described program converting method.

The present invention can provide a program converting method by which the virtual function call can be converted into the direct function call, and at the same time the improvement of execution performance as well as the reduction of code size can be achieved.

FURTHER INFORMATION ABOUT TECHNICAL BACKGROUND TO THIS APPLICATION

The disclosure of Japanese Patent Application No. 2004-336539 filed on Nov. 19, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 1 is a diagram showing an example of a program which includes a virtual function call;

FIG. 5 is a diagram showing an example of a program which includes a virtual function call according to the prior art;

FIG. 6 is a diagram showing a conversion result by the technology described in the Japanese Patent Laid-Open No. 2000-40007 publication;

FIG. 7 is a diagram showing a conversion result by the technology described in the Japanese Patent Laid-Open No. 10-320204 publication;

FIG. 8 is a diagram showing a problem according to the prior art;

FIG. 13 is a diagram showing an example of a program which is stored in a program storage unit 101 according to the first embodiment of the present invention;

FIG. 16 is a diagram showing virtual function re-definition information 114 according to the first embodiment of the present invention;

FIG. 20 is a diagram showing a program which is generated in the virtual function call conversion processing according to the first embodiment of the present invention;

FIG. 22 is a diagram showing class inheritance relationship information 113 according to the second embodiment of the present invention;

FIG. 23 is a diagram showing virtual function re-definition information 114 according to the second embodiment of the present invention;

FIG. 24 is a diagram showing virtual function direct call information 115 according to the second embodiment of the present invention;

FIG. 26 is a diagram showing a program which is generated by the virtual function call conversion processing according to the second embodiment of the present invention;

FIG. 30 is a diagram showing an example of a program which is store in a program storage unit 101 according to the third embodiment of the present invention;

FIG. 31 is a diagram showing class inheritance relationship information 113 according to the third embodiment of the present invention;

FIG. 32 is a diagram showing virtual function re-definition information 114 according to the third embodiment of the present invention;

FIG. 33 is a diagram showing virtual function direct call information 115 according to the third embodiment of the present invention;

FIG. 37 is a diagram showing a class definition which is generated in the virtual function definition duplication processing according to the third embodiment of the present invention;

FIG. 38 is a diagram showing a virtual function table which is generated in the virtual function definition duplication processing according to the third embodiment of the present invention;

FIG. 42 is a diagram showing class inheritance relationship information 113 according to the fourth embodiment of the present invention;

FIG. 43 is a diagram showing virtual function re-definition information 114 according to the fourth embodiment of the present invention;

FIG. 44 is a diagram showing virtual function direct call information 115 according to the fourth embodiment of the present invention;

FIG. 49 is a diagram showing a class definition which is generated in the virtual function definition duplication processing according to the fourth embodiment of the present invention;

FIG. 50 is a diagram showing a virtual function table which is generated in the virtual function definition duplication processing according to the fourth embodiment of the present invention;

FIG. 51 is a diagram showing a program which is generated in the virtual function call conversion processing according to the fourth embodiment of the present invention;

FIG. 53 is a diagram showing class inheritance relationship information 113 according to the fifth embodiment of the present invention;

FIG. 54 is a diagram showing virtual function redefinition information 114 according to the fifth embodiment of the present invention;

FIG. 55 is a diagram showing virtual function direct call information 115 according to the fifth embodiment of the present invention;

FIG. 59 is a diagram showing a class definition which is generated in virtual function definition duplication processing according to the fifth embodiment of the present invention;

FIG. 60 is a diagram showing a virtual function table which is generated in the virtual function definition duplication processing according to the fifth embodiment of the present invention;

FIG. 61 is a diagram showing a program which is generated in the virtual function call conversion processing according to the fifth embodiment of the present invention;

DESCRIPTION OF THE PREFERRED EMBODIMENT(S)

First Embodiment

The following describes one example of embodiments of a program converting apparatus according to the present invention with reference to the drawings.

In the first embodiment, in a case where the following conditions (1) to (4) are satisfied, it is possible to specify a pointer "this", so that a call to a virtual function F1 can be converted into a direct call to a function.

More specifically,

Condition (1): The virtual function F1 is described in a definition of a virtual function F2.

Condition (2): The virtual function F1 is called by the pointer "this".

Condition (3): A class C1 to which the virtual function F2 belongs does not have any derived classes, or the virtual function F2 is re-defined in all direct derived classes of the class C1.

Condition (4): The virtual function F2 is not directly called by an object in the derived class of the class C1.

Figures 2, 3, 4:
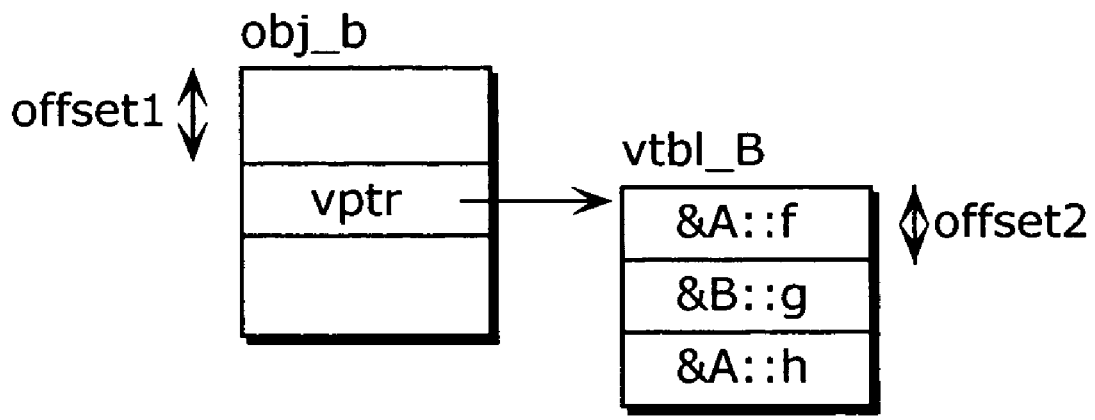
FIG. 2 is a diagram showing an example of implementation of a virtual function call.
FIG. 3 is a diagram showing assembler codes corresponding to the virtual function call.
FIG. 4 is a diagram showing assembler codes corresponding to a direct function call.
Figure 9:
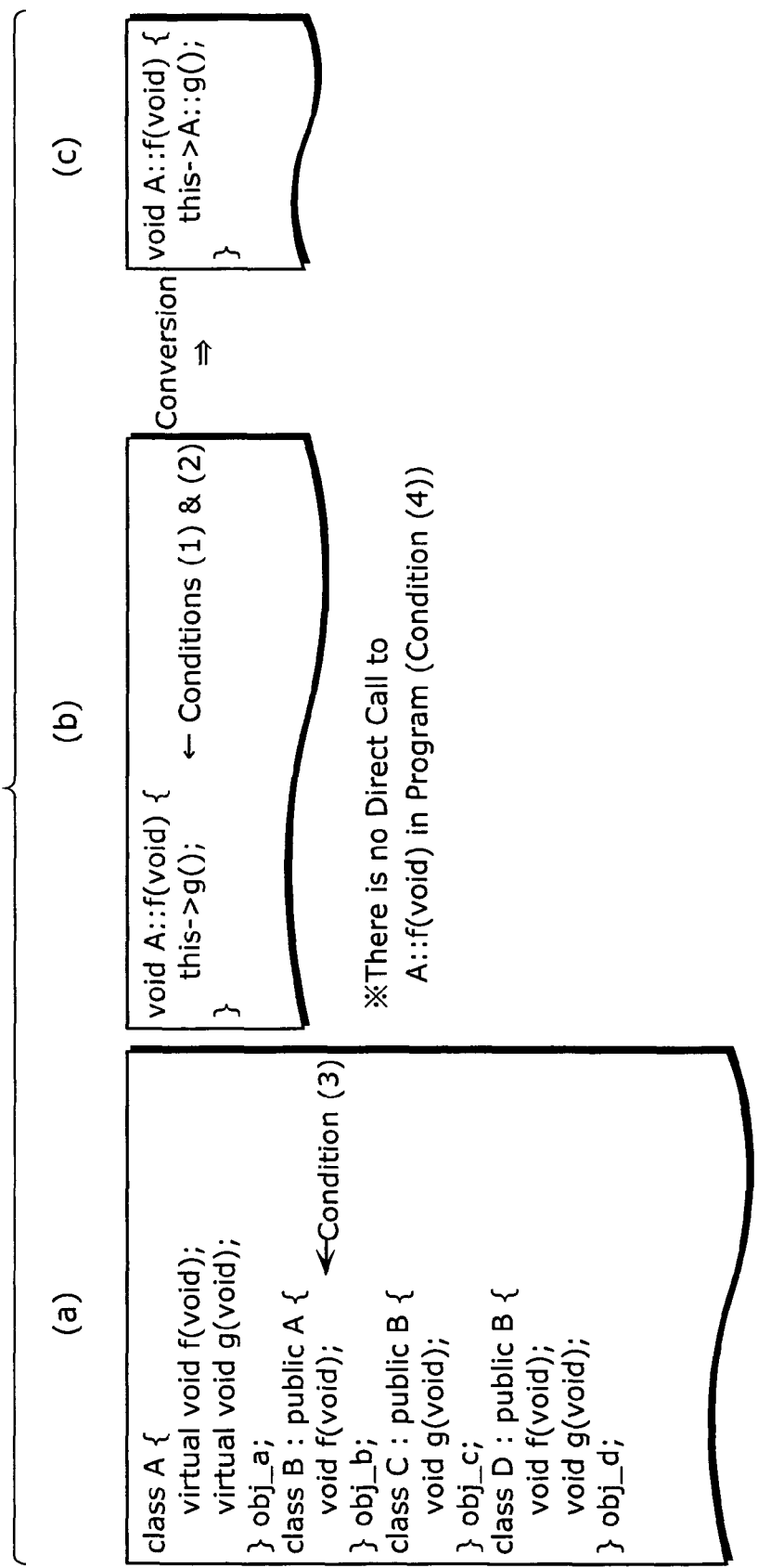
FIG. 9 is a schematic diagram explaining processing which is performed by a program converting apparatus according to the first embodiment of the present invention.

FIG. 9 is a schematic diagram explaining processing which is performed, based on the above-mentioned four conditions, by a program converting apparatus according to the first embodiment. Here, it is assumed that classes are defined as shown in (a) of FIG. 9, and a program is described as shown in (b) of FIG. 9.

In a case where a virtual function g is regarded as the virtual function F1, and a virtual function f is regarded as the virtual function F2, a statement "this->g( )" in (b) of FIG. 9 satisfies the conditions (1) and (2). More specifically, the virtual function F1 (virtual function g) is described in a definition of the virtual function F2 (virtual function f), which satisfies the condition (1). In addition, the virtual function F1 (virtual function g) is called by the pointer "this", which satisfies the condition (2).

Further, regarding the condition (3), the class C1 to which the virtual function F2 (virtual function f) belongs is a class A, as shown in (b) of FIG. 9. Therefore, as shown in (a) of FIG. 9, the virtual function F2 (virtual function f) is re-defined in all direct derived classes (namely, class B) of the class C1 (class A). Accordingly, this satisfies the condition (3).

Still further, regarding the condition (4), there is no direct call to A::f(void) in the program. This means that the virtual function F2 (virtual function f) is not directly called by objects in the derived classes (classes B, C, and D) of the class C1 (class A). Therefore, this satisfies the condition (4).

Accordingly, in the above case, it is possible to convert a call to the virtual function g as shown in (b) of FIG. 9 into a direct call to the virtual function g in the class A as shown in (c) of FIG. 9.

<Structure of Program Converting Apparatus>

Figure 10:
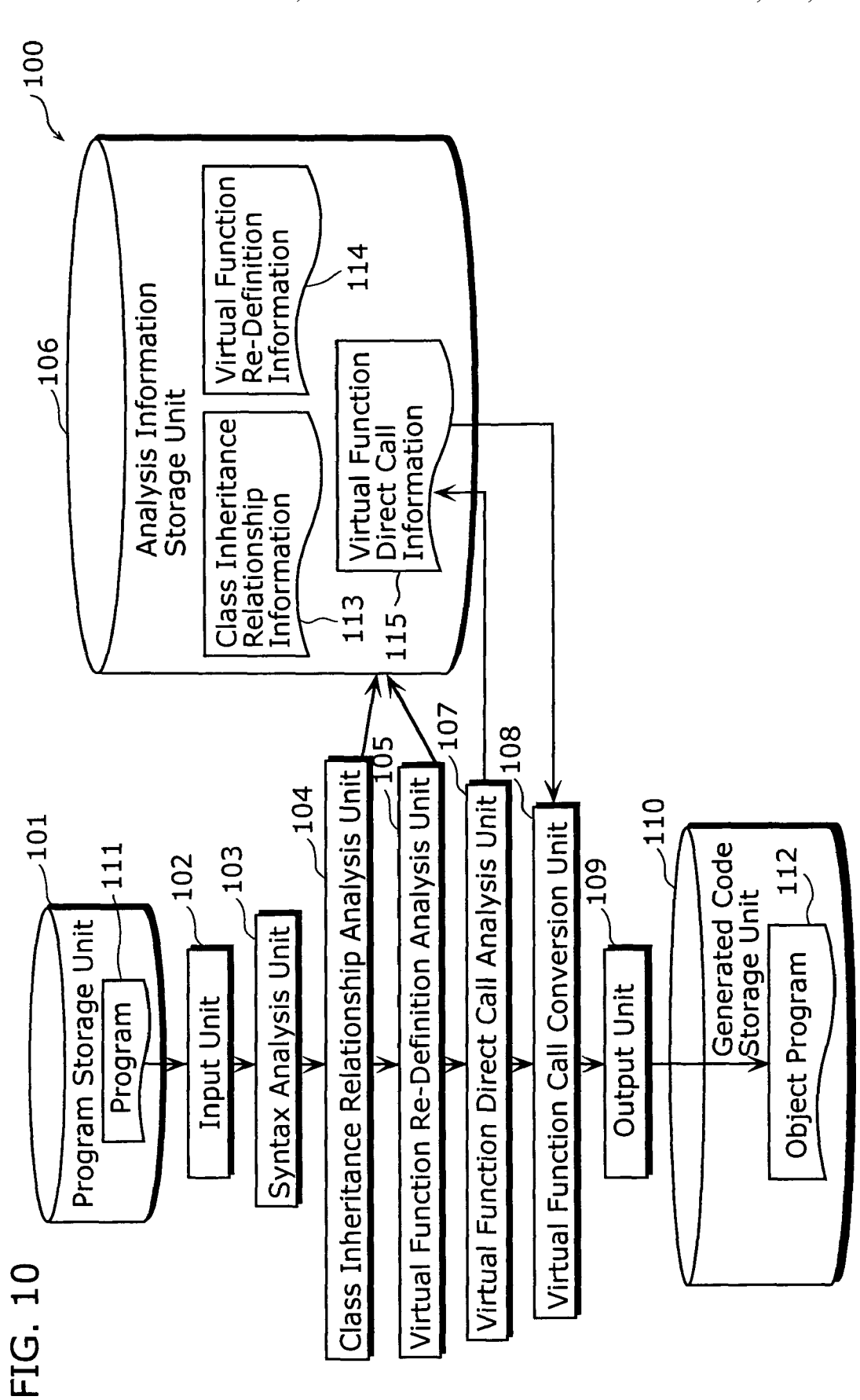
FIG. 10 is a diagram showing a structure of the program converting apparatus according to the first embodiment of the present invention.

FIG. 10 is a diagram showing a structure of a program converting apparatus 100 according to the first embodiment of the present invention. The program converting apparatus 100 is a device which receives a program that is described in the object-oriented C++ language, and outputs an object program. The program converting apparatus 100 includes a program storage unit 101, an input unit 102, a syntax analysis unit 103, a class inheritance relationship analysis unit 104, a virtual function re-definition analysis unit 105, an analysis information storage unit 106, a virtual function direct call analysis unit 107, a virtual function call conversion unit 108, an output unit 109, and a generated code storage unit 110.

The program storage unit 101 is a storage device which stores a program 111 that is described in the object-oriented C++ language and is to be converted in the program converting apparatus 100. The program storage unit 101 stores one or more programs 111.

The input unit 102 is a processing unit which sequentially inputs all programs 111 that are stored in the program storage unit 101 and outputs the programs into the syntax analysis unit 103.

The syntax analysis unit 103 is a processing unit which analyzes syntaxes of the programs 111 received from the input unit 102, creates symbol tables or syntax trees regarding programs, and outputs results of the analysis into the class inheritance relationship analysis unit 104.

The class inheritance relationship analysis unit 104 is a processing unit which extracts all classes included in the respective programs 111, analyzes inheritance relationship among the classes, and generates class inheritance relationship information as results of the analysis.

The virtual function re-definition analysis unit 105 is a processing unit which analyzes whether or not virtual functions in the respective classes are re-definitions of virtual functions in respective base classes of those classes, and generates virtual function re-definition information as results of the analysis.

The virtual function direct call analysis unit 107 is a processing unit which analyzes virtual functions directly called in the program and invoked objects, and generates virtual function direct call information.

The analysis information storage unit 106 is a storage device which stores the class inheritance relationship information 113 that is generated by the class inheritance relationship analysis unit 104, the virtual function re-definition information 114 that is generated by the virtual function re-definition analysis unit 105, and the virtual function direct call information 115 that is generated by the virtual function direct call analysis unit 107.

The virtual function call conversion unit 108 is a processing unit which refers to the class inheritance relationship information 113, the virtual function re-definition information 114, and the virtual function direct call information 115 that are stored in the analysis information storage unit 106, determines whether or not a virtual function call can be converted into a direct function call, and if the function call can be converted, converts the virtual function call into the direct function call.

The output unit 109 is a processing unit which stores results of the conversion by the virtual function call conversion unit 108, as an object program 112, into the generated code storage unit 110.

The generated code storage unit 110 is a storage device which stores the object program 112.

<Brief Description of Processing Performed by Program Converting Apparatus>

Figure 11:
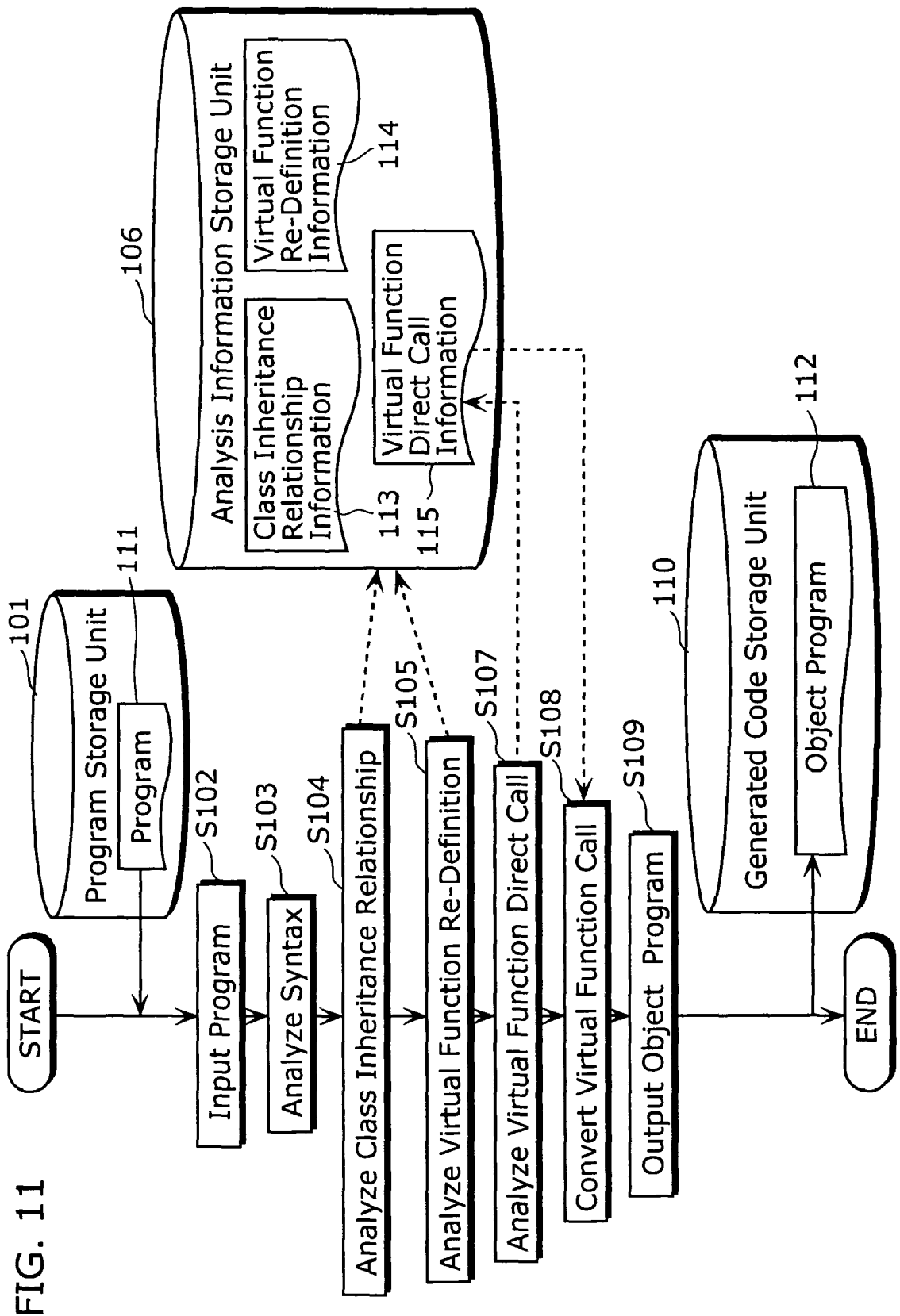
FIG. 11 is a diagram showing a structure of program converting processing according to the first embodiment of the present invention.

FIG. 11 is a flowchart of processing which is performed by the program converting apparatus 100 according to the first embodiment of the present invention.

The input unit 102 sequentially inputs all programs 111 stored in the program storage unit 101 and outputs the programs into the syntax analysis unit 103 (S102).

The syntax analysis unit 103 analyzes syntaxes of the respective programs 111 that have been received from the input unit 102, creates symbol tables or syntax trees regarding the programs, and outputs results of the analysis to the class inheritance relationship analysis unit 104 (S103).

The class inheritance relationship analysis unit 104 extracts all classes included in the respective programs 111, analyzes inheritance relationships among the classes, and stores results of the analysis, as class inheritance relationship information, into the analysis information storage unit 106 (S104).

The virtual function re-definition analysis unit 105 analyzes whether or not virtual functions in the respective classes are re-definitions of virtual functions of respective base classes of those classes, and stores results of the analysis, as virtual function re-definition information, into the analysis information storage unit 106 (S105).

The virtual function direct call analysis unit 107 analyzes virtual functions directly called in the program and invoked objects, and generates virtual function direct call information (S107).

The virtual function call conversion unit 108 refers to the class inheritance relationship information 113, the virtual function re-definition information 114, and the virtual function direct call information 115 that are stored in the analysis information storage unit 106, determines whether or not a virtual function call can be converted into a direct function call, and if the virtual function call can be converted, converts the virtual function call into the direct function call (S108).

The output unit 109 stores results of the conversion by the virtual function call conversion unit 108, as an object program 112, into the generated code storage unit 110 (S109).

Note that input processing at Step S102, syntax analysis processing at Step S103, output processing at Step S109 are not special features of the present invention, so that those processing are not described in detail herein.

<Details of Processing Performed by Program Converting Apparatus>

Next, processing performed by the program converting apparatus 100 is described in more detail with reference to examples of the program.

Firstly, the input unit 102 inputs all programs 111 from the program storage unit 101 (S102), and the syntax analysis unit 103 creates syntax trees or symbol tables of the respective programs 111 (S103).

Figure 12:
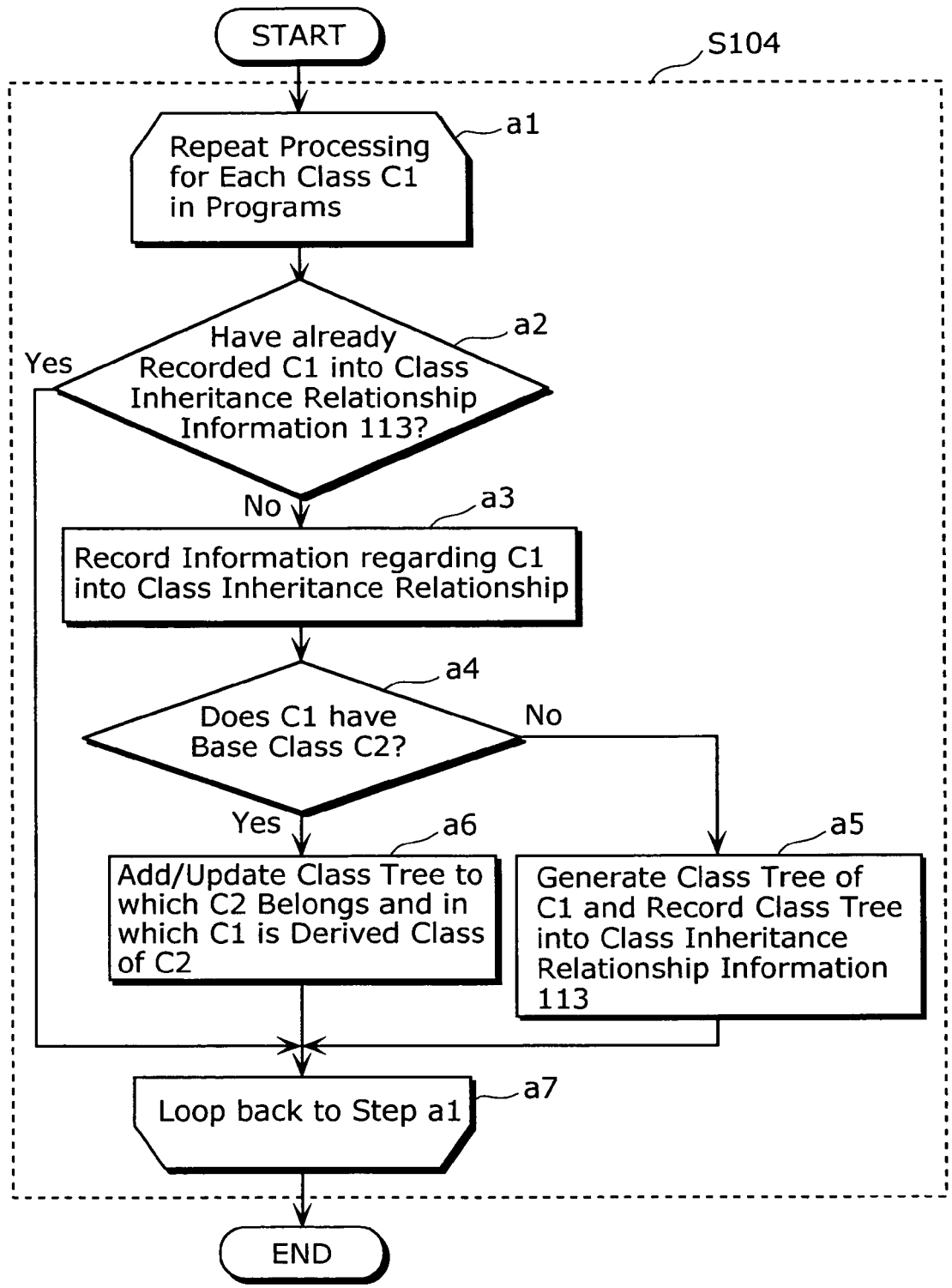
FIG. 12 is a flowchart showing class inheritance relationship analysis processing (S104)

Next, the class inheritance relationship analysis processing (S104) is described in more detail. FIG. 12 is a flowchart showing the class inheritance relationship analysis processing (S104) in detail. Here, it is assumed that the program 111 shown in FIG. 13 is a program 111 to be inputted into the program converting apparatus 100.

The class inheritance relationship analysis processing (S104) includes Steps a1 to a7. The following describes the class inheritance relationship analysis processing (S104) in the step order.

At Step a1, the class inheritance relationship analysis unit 104 repeats the following processing for all classes C1 which are included in the respective programs 111 that have been analyzed by the syntax analysis unit 103. In other words, the following processing are repeated for respective classes A, B, C, and D which are included in all programs 111 of FIG. 13.

At Step a2, the class inheritance relationship analysis unit 104 analyzes whether or not information regarding the class C1 has already been stored in the class inheritance relationship information 113. If the information regarding the class C1 has already been stored, then the processing skips directly to Step a7, and if not, then the processing proceeds to Step a3. When a class A of FIG. 13 is analyzed firstly, a determination at Step a2 is "No" and the processing proceeds to Step a3. Note that, when the class A is further analyzed after the above steps, the determination at Step a2 is "Yes" and the processing skips directly to Step a7. The same processing as Step a2 is also performed for the classes B, C and D.

At Step a3, the class inheritance relationship analysis unit 104 stores the information regarding the class C1 into the class inheritance relationship information 113. In a case where the class A of FIG. 13 is processed at Step a3, information regarding the class A is stored into the class inheritance relationship information 113. The same processing as Step a3 is also performed for the classes B, C and D.

At Step a4, the class inheritance relationship analysis unit 104 analyzes whether or not the class C1 has a base class C2 from which the class C1 is derived. If the class C1 does not have such a base class C2, then the processing proceeds to Step a5, and if the class C1 has the base class C2, then the processing skips directly to Step a6. In a case of the class A of FIG. 13, the class A does not have any base classes. Therefore, a determination at Step a4 is "No", and the processing proceeds to Step a5. On the other hand, in a case of the class B, the class B has the class A as a base class, the determination at Step a4 is "Yes" and the processing skips directly to Step a6. The classes C and D also have the class B as the base class, so that the determination at Step a4 is "Yes" and the processing skips directly to Step a6.

At Step a5, the class inheritance relationship analysis unit 104 generates a class tree regarding the class C1, and stores the generated class tree into the class inheritance relationship information 113 (a5). The class tree is a graph which indicates inheritance relationships among classes. In a case of the class A of FIG. 13, the class inheritance relationship analysis unit 104 generates a class tree regarding the class A, and records the generated class tree into the class inheritance relationship information 113.

At Step a6, the class inheritance relationship analysis unit 104 adds the class C1, as a derived class, to the class tree to which the class C2 belongs, and updates the class tree. In a case of the class B of FIG. 13, the class B is recorded, as a derived class of the class A, into the class tree to which the class A belongs. The classes C and D are also recorded into the class tree, as derived classes of the class B.

At Step a7, the processing loops back to Step a1 in order to repeat the steps for other classes.

Figure 14:
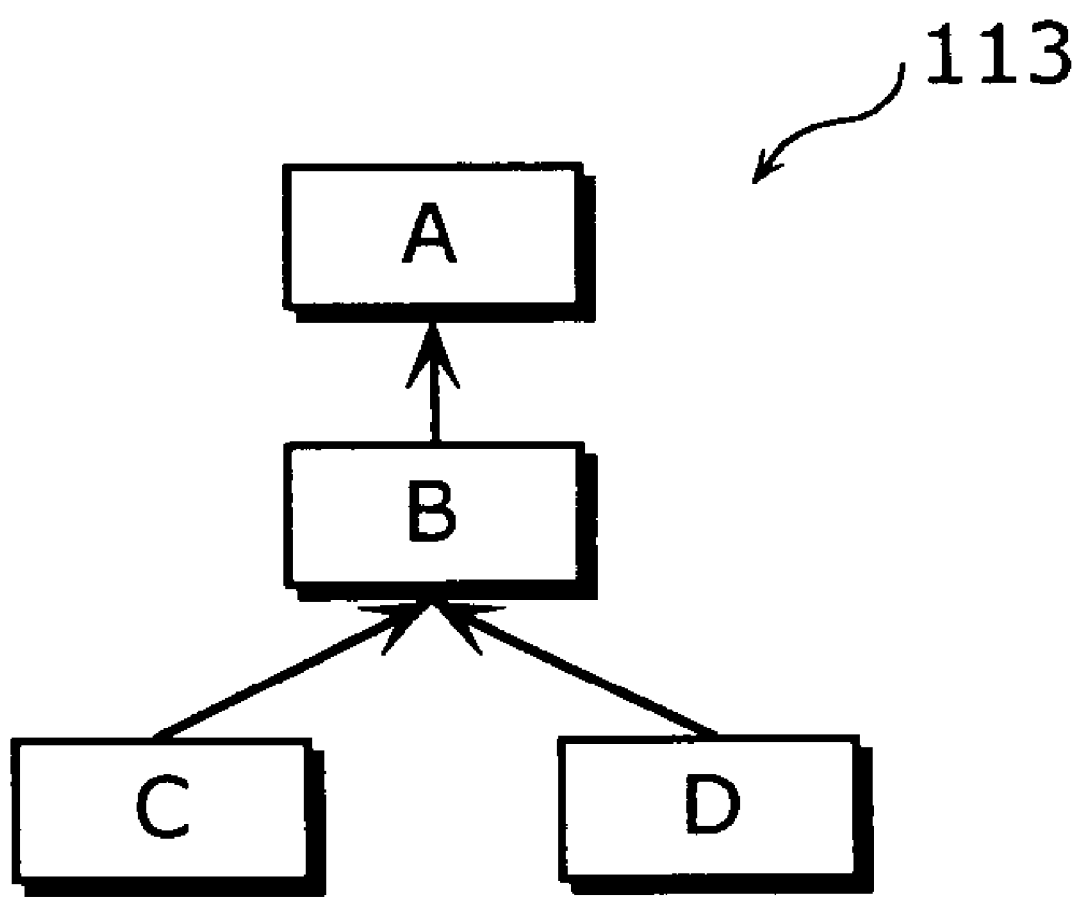
FIG. 14 is a diagram showing class inheritance relationship information 113 according to the first embodiment of the present invention.

FIG. 14 is a diagram showing the class inheritance relationship information 113 which is generated by analyzing the programs 111 of FIG. 13 by the class inheritance relationship analysis unit 104. The class inheritance relationship information 113 indicates that the class B is a derived class of the class A, and the classes C and D are derived classes of the class B.

Figure 15:
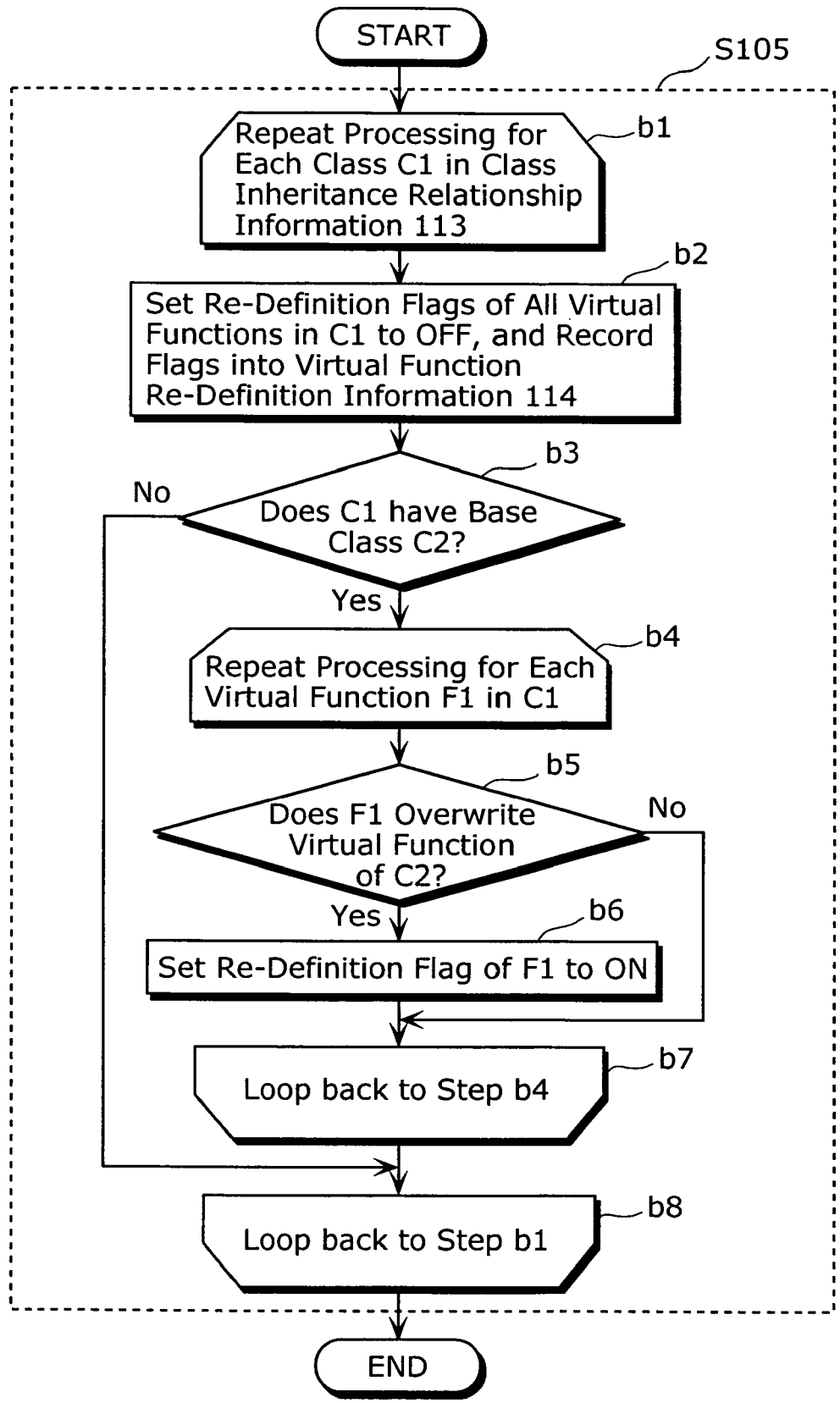
FIG. 15 is a flowchart of virtual function re-definition analysis processing (S105)

Next, the virtual function re-definition analysis processing (S105) is described in more detail. FIG. 15 is a flowchart showing the virtual function re-definition analysis processing (S105) in detail. Here, it is assumed that the program 111 shown in FIG. 13 is a program 111 to be inputted in the program converting apparatus 100.

The virtual function re-definition analysis processing (S105) includes Steps b1 to b8. The following describes the virtual function re-definition analysis processing (S105) in the step order.

At Step b1, the virtual function re-definition analysis processing (S105) repeats the following processing for all classes C1 which are included in the class inheritance relationship information 113. In other words, the following processing are repeated for respective classes A, B, C, and D shown in FIG. 14.

At Step b2, the virtual function re-definition analysis unit 105 sets re-definition flags of all virtual functions in the class C1 to "OFF", and records the flags to the virtual function re-definition information 114. In a case of the class A, the re-definition flags of the virtual functions f, g, and h are set to "OFF" and the flags are recorded into the virtual function re-definition information 114. Such flags are also recorded as described above, in the case of processing for the classes B, C and D.

At Step b3, the virtual function re-definition analysis unit 105 analyzes whether or not the class C1 has a base class C2. If the class C1 has the base class C2, then the processing proceeds to Step b4, and if not, then the processing skips directly to Step b8. In a case where the class A shown in the class inheritance relationship information 113 of FIG. 14 is analyzed, the class A does not have any base classes, so that a determination at Step b3 is "No" and the processing skips directly to Step b8. On the other hand, in a case of the class B, the class B has the class A as the base class, the determination at Step b3 is "Yes" and the processing proceeds to Step b4. The classes C and D also have the base class B, so that the determination at Step b3 is "Yes" and the processing proceeds to Step b4.

At Step b4, the virtual function re-definition analysis unit 105 repeats the following processing for all virtual functions F1 in the class C1. In a case of the class B of FIG. 13, the following processing is repeated for the virtual functions f, g, and h in the class B.

At Step b5, the virtual function re-definition analysis unit 105 analyzes whether or not the virtual function F1 in the class C1 is overridden on a virtual function in the base class C2 of the class C1. If the virtual function F1 is overridden on the virtual function in the base class C2, then the processing proceeds to Step b6, and if not, then the processing skips directly to Step b7. In a case of the virtual function f in the class B of FIG. 13, the virtual function F1 is overridden on the virtual function f in the base class A, so that the determination at Step b5 is "Yes" and the processing proceeds to Step b6. On the other hand, in a case of the virtual function h in the class B, the virtual function F1 is not overridden on the virtual function f in the base class A, so that the determination at Step b5 is "No" and the processing skips directly to Step b7.

At Step b6, the virtual function re-definition analysis unit 105 sets the re-definition flag of the virtual function F1 to "ON". In a case of the virtual function f in the class B of FIG. 13, a re-definition flag corresponding to the virtual function f in the class B is set to "ON".

At Step b7, in the virtual function re-definition analysis unit 105, the processing loops back to Step b4 to repeat the above Steps from b4 to b7 for other virtual functions F1.

At Step b8, in the virtual function re-definition analysis unit 105, the processing loops back to Step b1 in order to repeat the above Steps from b1 to b8 for other classes C1.

FIG. 16 is a diagram showing the virtual function re-definition information 114 which is generated by analyzing the programs 111 of FIG. 13 by the virtual function re-definition analysis unit 105. In the virtual function re-definition information 114, columns on the left indicate names of classes, columns in the middle indicate names of virtual functions, and columns on the right indicate whether or not the virtual functions are re-defined. "ON" represents that the virtual function is re-defined, and "OFF" represents that the virtual function is not re-defined. For example, it is indicated that, in the class B, the virtual functions f and g are re-defined, but the virtual function h is not re-defined.

Figure 17:
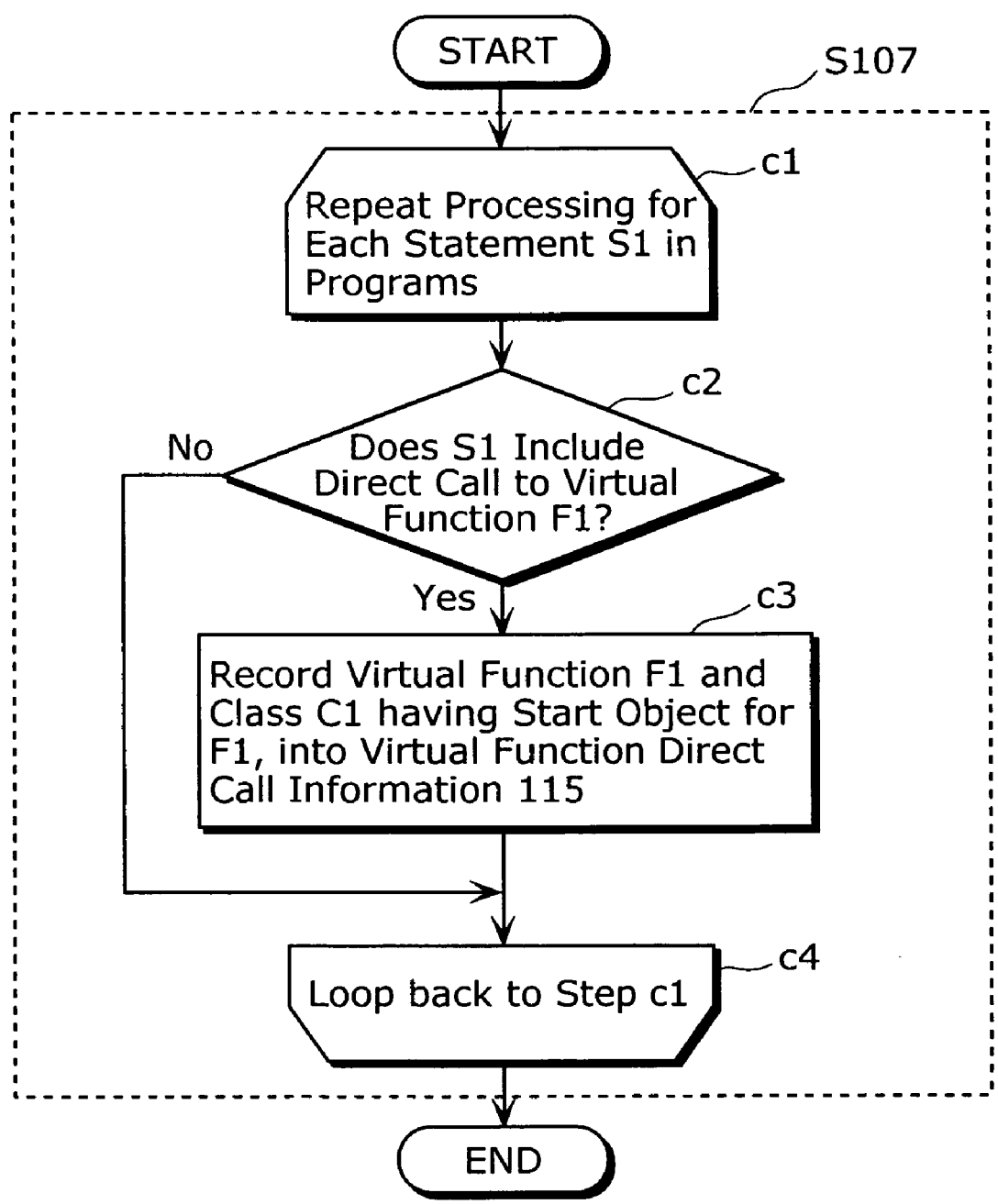
FIG. 17 is a flowchart of virtual function direct call analysis processing (S107)

Next, the virtual function direct call analysis processing (S107) is described in more detail. FIG. 17 is a flowchart showing the virtual function direct call analysis processing (S107) in detail. Here, it is assumed that the program 111 shown in FIG. 13 is a program 111 to be inputted in the program converting apparatus 100.

The virtual function direct call analysis processing (S107) includes Steps c1 to c4. The following describes the virtual function direct call analysis processing (S107) in the step order.

At Step c1, the virtual function direct call analysis unit 107 repeats the following processing for all statements S1 which are included in the respective programs 111 that have been analyzed by the syntax analysis processing (S103). In FIG. 13, "this->g( );", "obj_c.g( );", and the like are the statements to be analyzed.

At Step c2, the virtual function direct call analysis unit 107 analyzes whether or not the statement S1 includes a direct call to the virtual function F1. If the statement S1 includes the direct call to the virtual function F1, then the processing proceeds to Step c3, and if not, then the processing skips directly to Step c4. In a case of the statement "this->g( );" in FIG. 13, the virtual function g in the class A is not directly called, so that a determination at Step c2 is "No" and the processing skips directly to Step c4. On the other hand, in a case of the statement "obj_c.g( );", the virtual function g in the class B is directly called, so that the determination at Step c2 is "Yes" and the processing proceeds to Step c3.

At Step c3, the virtual function direct call analysis unit 107 records the virtual function F1 and the class C1 which has an invoked object for the virtual function F1, into the virtual function direct call information 115. In a case of the statement "obj_c.g( );" in FIG. 13, "B::g" and the class C having the invoked object are recorded into the virtual function direct call information 115.

At Step a4, in the virtual function direct call analysis unit 107, the processing loops back to Step c1 in order to repeat the above steps for other statements.

Figure 18:
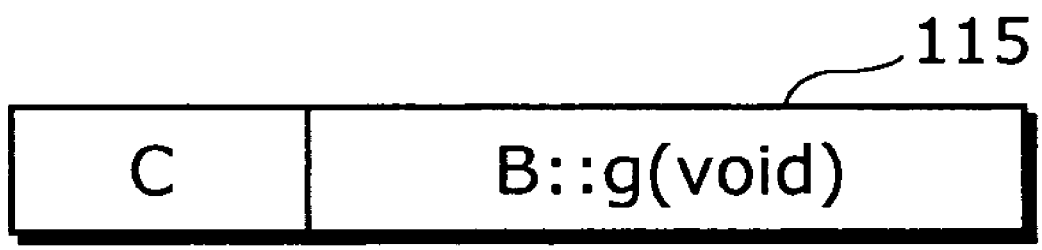
FIG. 18 is a diagram showing virtual function direct call information 115 according to the first embodiment of the present invention.

FIG. 18 is a diagram showing the virtual function direct call information 115 which is generated by analyzing the programs 111 of FIG. 13 by the virtual function direct call analysis unit 107.

Figure 19:
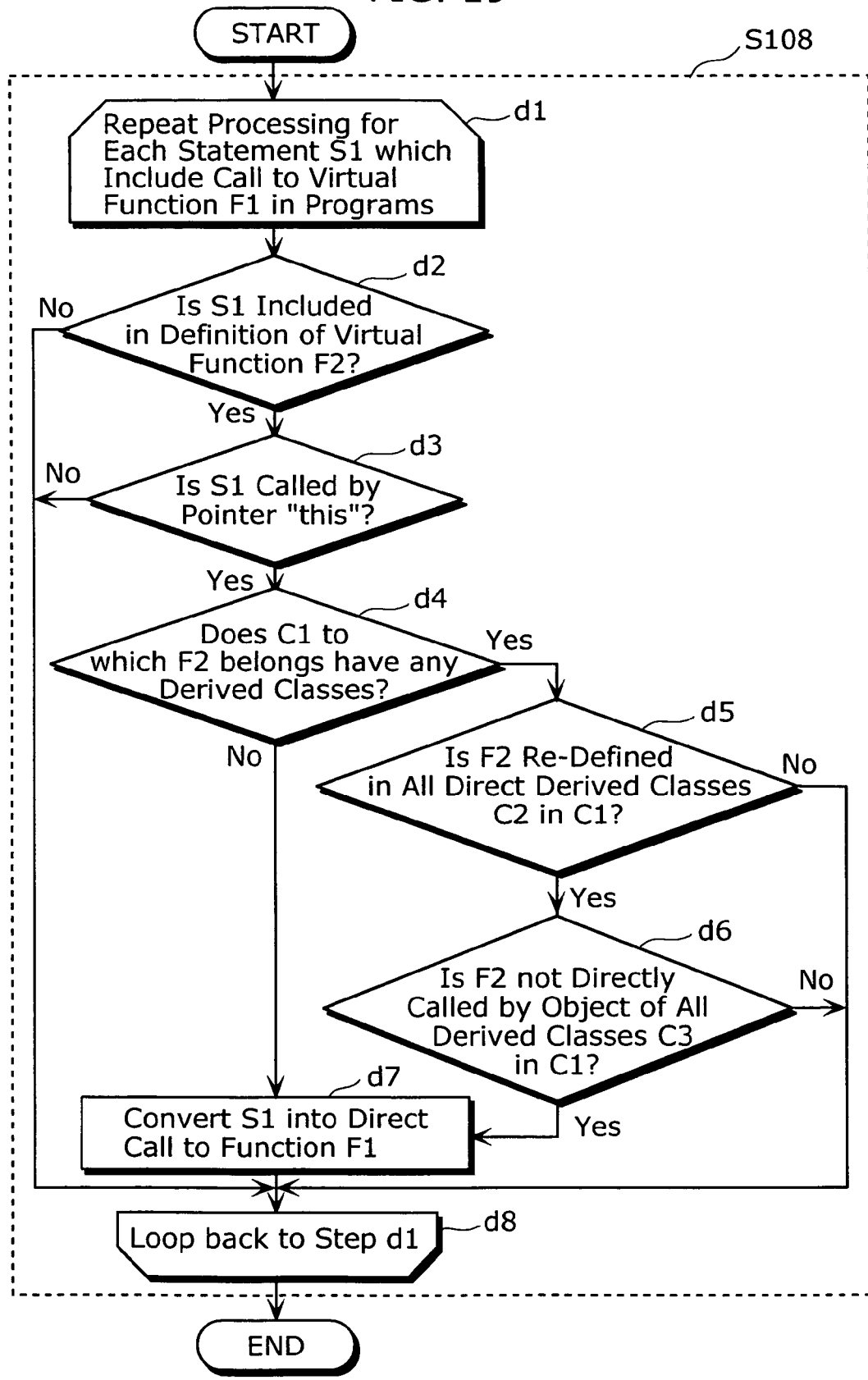
FIG. 19 is a flowchart of virtual function call conversion processing (S108)

Next, the virtual function call conversion processing (S108) is described in more detail. FIG. 19 is a flowchart showing the virtual function call conversion processing (S108) in detail. Here, it is assumed that the program 111 shown in FIG. 13 is a program 111 to be inputted in the program converting apparatus 100.

The virtual function call conversion processing (S108) includes Steps dl to d8. The following describes the virtual function call conversion processing (S108) in the step order.

At Step d1, the virtual function call conversion unit 108 repeats the following processing for all statements S1 which includes calls to the virtual functions F1 in the respective programs 111. In FIG. 13, "this->g( );", "this->h( );", and the like are the statements to be converted.

At Step d2, the virtual function call conversion unit 108 analyzes whether or not the statement S1 is included in a definition of the virtual function F2. If the statement S1 is included in the definition of the virtual function F2, then the processing proceeds to Step d3, and if not, then the processing skips directly to Step d8. The statement "this->g( );" in FIG. 13 is included in a virtual function "A::f", so that a determination at Step d2 is "Yes" and the processing proceeds to Step d3. In the same manner, the statement "this->h( );" is included in a virtual function "B::g", so that the determination at Step d2 is "Yes" and the processing proceeds to Step d3. On the other hand, the statement "obj_c. g( );" is included in a function t, but the function t is not a virtual function, so that the determination at Step d2 is "No" and the processing skips directly to Step d8.

At Step d3, the virtual function call conversion unit 108 analyzes whether or not the statement S1 is called by a pointer "this". If the statement S1 is called by the pointer "this", then the processing proceeds to Step d4, and if not, then the processing skips directly to Step d8. In the statements "this->g( );" and "this->h( );", the virtual functions g and h are called by the pointer "this", so that a determination at Step d3 is "Yes" and the processing proceeds to Step d4. Note that the above pointer "this" is, as described above, a special pointer which points an object whose member functions are invoked, among member functions. For example, the member function g in the class B is executed by a member function call "obj_c.g( );" in the function t of FIG. 13. Here, the pointer "this" of the member function g in the class B points an object obj_c which invokes the member function g.

At Step d4, the virtual function call conversion unit 108 analyzes, with reference to the class inheritance relationship information 113, whether or not the class C1 to which the virtual function F2 belongs has any derived classes. If the class C1 has any derived class, then the processing proceeds to Step d5, and if not, then the processing skips directly to Step d7. In the virtual function "A::f" in FIG. 13, the class A to which the virtual function f belongs is understood to have a derived class, with reference to the class inheritance relationship information 113, so that a determination at Step d4 is "Yes" and the processing proceeds to Step d5. In the same manner, in the virtual function "B::g", the class B to which the virtual function g belongs is understood to have derived classes, so that the determination at Step d4 is "Yes".

At Step d5, the virtual function call conversion unit 108 analyzes whether or not the virtual function F2 is re-defined in all direct derived classes C2 of the class C1. If the virtual function F2 is re-defined in all direct derived classes C2 of the class C1, then the processing proceeds to Step d6, and if not, the processing skips directly to Step d8. In FIG. 13, with reference to the virtual function re-definition information 114, the virtual function f is understood to be re-defined in all direct derived classes (namely, class B) of the class A, so that a determination at Step d5 is "Yes" and the processing proceeds to Step d6. On the other hand, the virtual function g is understood to be re-defined in the direct derived class D of the class B, but the virtual function g is understood not to be re-defined in the direct derived class C, so that the determination at Step d5 is "No" and the processing skips directly to Step d8.

At Step d6, the virtual function call conversion unit 108 analyzes whether or not the virtual function F2 is not directly called by objects of all derived classes C3 in the class C1. If the virtual function F2 is not directly called by objects of all derived classes, then the processing proceeds to Step d7, and if the virtual function F2 is directly called, then the processing skips directly to Step d8. With reference to the virtual function direct call information 115, it is understood that the virtual function f is not directly called by the objects of all derived classes B, C, and D of the class A, so that the determination at Step d6 is "Yes" and the processing proceeds to Step d7.

At Step d7, the virtual function call conversion unit 108 converts the statement S1 into a direct call to the function F1. In the statement "this->g( );" in FIG. 13, the virtual function g is converted into a direct call, so that the virtual function g is converted into the same code as described as "this->A::g( );".

At Step b8, in the virtual function call conversion unit 108, the processing loops back to Step dl in order to repeat the above steps for other statements.

Figure 20:
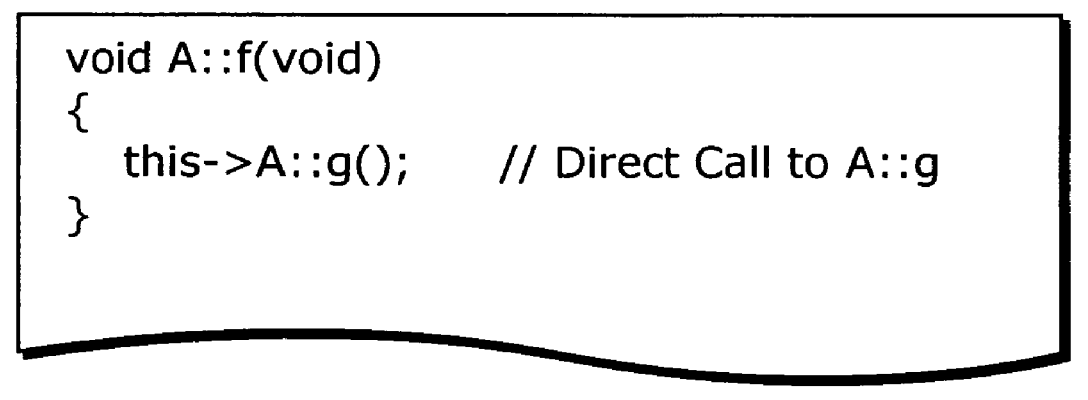

FIG. 20 is a diagram showing a code which is generated by converting the program 111 of FIG. 13 by the virtual function call conversion unit 108. By this cord, a virtual function "A::g" is directly called.

As described above, by inputting the program 111 shown in FIG. 13 into the program converting apparatus 100 according to the first embodiment, it is possible to convert the statement "this->g( );" including a virtual function call, into a direct call to the function. Thereby, it is possible to increase an execution speed during execution of the object program 112.

Note that the above embodiment has described that the class inheritance relationship analysis processing (5104), the virtual function re-definition analysis processing (S105), the virtual function direct call analysis processing (5107), the virtual function call conversion processing (5108) are performed only once respectively, but it is possible to perform these processing for a plurality of times, if necessary.

Note also that it has been described that a type of the pointer "this" can be specified by the definition of the virtual function, when the virtual function and the class to which the virtual function belongs satisfy the specific conditions. However, in a constructor which generates class objects or a destructor which deletes the class objects, the pointer "this" can be specified to a class to which the constructor or the destructor belong. Therefore, it is possible to convert a virtual function call which is pointed by the pointer "this" described in the constructor or the destructor, into a direct function call.

Note also that, in a case where the type of the pointer "this" can be specified by characteristics of the program or by execution results of the program, it is possible to convert the virtual function call into the direct function call, based on a pragma directive, an option designation, execution history information, or the like.

Second Embodiment

The second embodiment differs from the first embodiment in processing which is performed by the virtual function call conversion unit 108.

In the second embodiment, in a case where the following conditions (1) to (4) are satisfied, it is possible to specify the pointer "this", so that a call to the virtual function F1 can be converted into a direct call to a function.

More specifically,

Condition (1): The virtual function F1 is described in a definition of a virtual function F2.

Condition (2): The virtual function F1 is called by the pointer "this".

Condition (3): A class C1 to which the virtual function F2 belongs does not have any derived classes, or the virtual function F2 is re-defined in a derived class C2 to which the virtual function F1 is re-defined.

Condition (4): The virtual function F2 is not directly called by any objects in the derived classes except the class C2.

Figure 21:
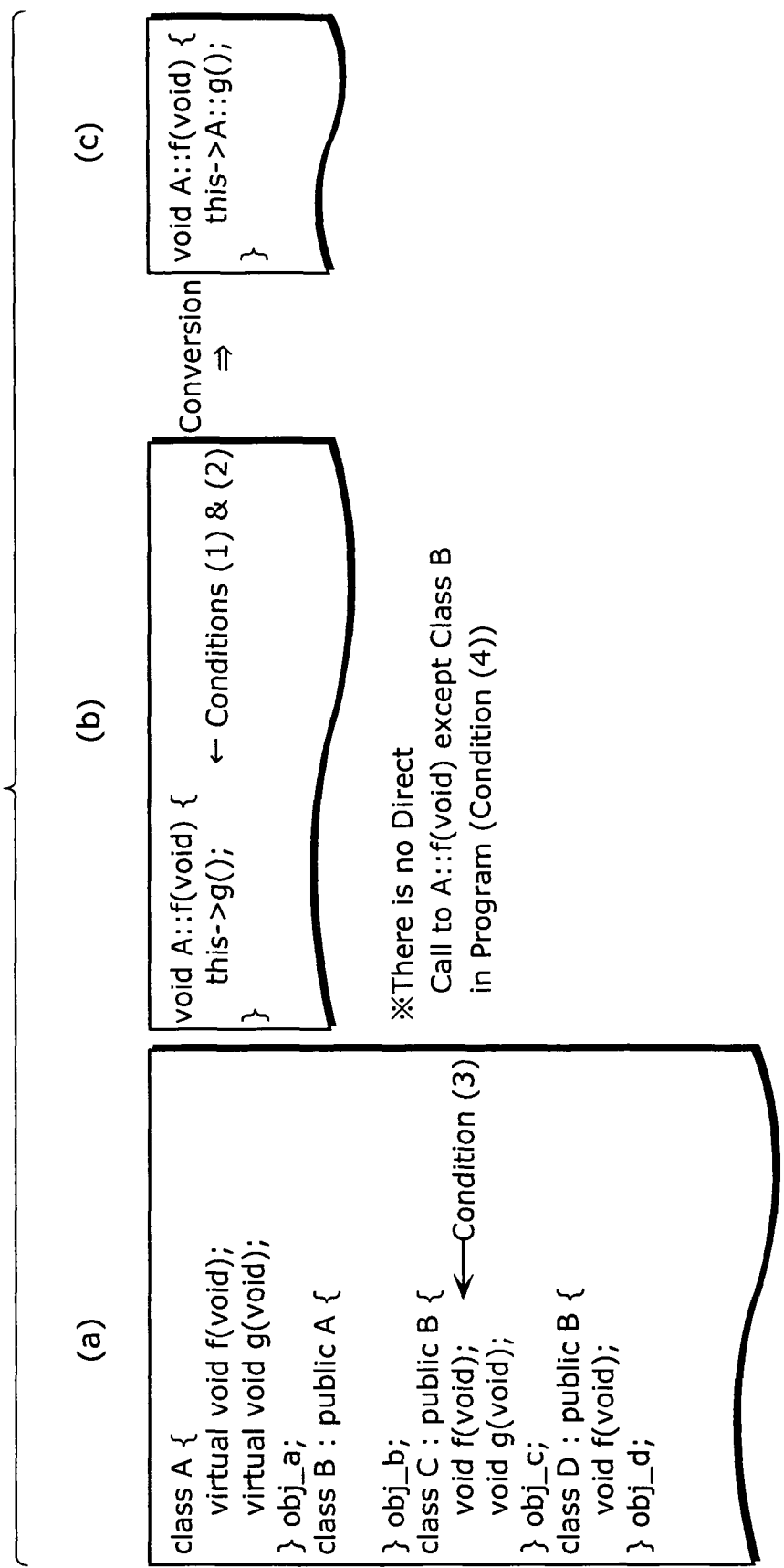
FIG. 21 is a schematic diagram explaining processing which is performed by a program converting apparatus according to the second embodiment of the present invention.

FIG. 21 is a schematic diagram explaining processing which is performed, based on the above-mentioned four conditions, by a program converting apparatus according to the second embodiment. Here, it is assumed that classes are defined as shown in (a) of FIG. 21, and a program is described as shown in (b) of FIG. 21.

In a case where a virtual function g is regarded as the virtual function F1, and a virtual function f is regarded as the virtual function F2, a statement "this->g( )" in (b) of FIG. 21 satisfies the conditions (1) and (2). More specifically, the virtual function F1 (virtual function g) is described in a definition of the virtual function F2 (virtual function f), which satisfies the condition (1). In addition, the virtual function F1 (virtual function g) is called by the pointer "this", which satisfies the condition (2).

Further, regarding the condition (3), the virtual function F2 (virtual function f) is re-defined in the class C2 (class C) to which the virtual function F1 (virtual function g) is re-defined, as shown in (a) of FIG. 21. Accordingly, this satisfies the condition (3).

Still further, regarding the condition (4), there is no direct call to A::f(void) in any classes except a class A in the program. This means that the virtual function F2 (virtual function f) is not directly called by objects in the derived classes (classes B and D) except the class C2 (class C). Therefore, this satisfies the condition (4).

Accordingly, in the above case, it is possible to convert a call to the virtual function g as shown in (b) of FIG. 21 into a direct call to the virtual function g in the class A as shown in (c) of FIG. 21.

Next, processing performed by the program converting apparatus 100 according to the second embodiment is described with reference to examples of the program.

As shown in FIG. 11, the input unit 102 inputs all programs 111 from the program storage unit 101 (S102), and the syntax analysis unit 103 creates symbol tables or syntax trees regarding the programs (S103).

Next, the class inheritance relationship analysis unit 104 analyzes inheritance relationships among the classes included in the programs 111, and stores results of the analysis into the class inheritance relationship information 113 (S104). The class inheritance relationship analysis processing (S104) is the same processing as shown in FIG. 12. FIG. 22 shows the class inheritance relationship information 113 which is the results of analyzing the programs 111 of FIG. 13 by the class inheritance relationship analysis processing (S104).

Next, the virtual function re-definition analysis unit 105 analyzes status of re-definition of virtual functions in the respective base classes, and stores results of the analysis into the virtual function re-definition information 114 (S105). The virtual function re-definition analysis processing (S105) is the same processing as shown in FIG. 15. FIG. 23 shows the virtual function re-definition information 114 which is the results of analyzing the programs 111 of FIG. 13 by the virtual function re-definition analysis processing (S105).

Next, the virtual function direct call analysis unit 107 analyzes virtual functions to be directly called, and stores the results of the analysis into the virtual function direct call information 115 (S107). The virtual function direct call analysis processing (S107) is the same processing as shown in FIG. 17. FIG. 24 shows the virtual function direct call information 115 which is the results of analyzing the programs 111 of FIG. 13 by the virtual function direct call analysis processing (S107).

Figure 25:
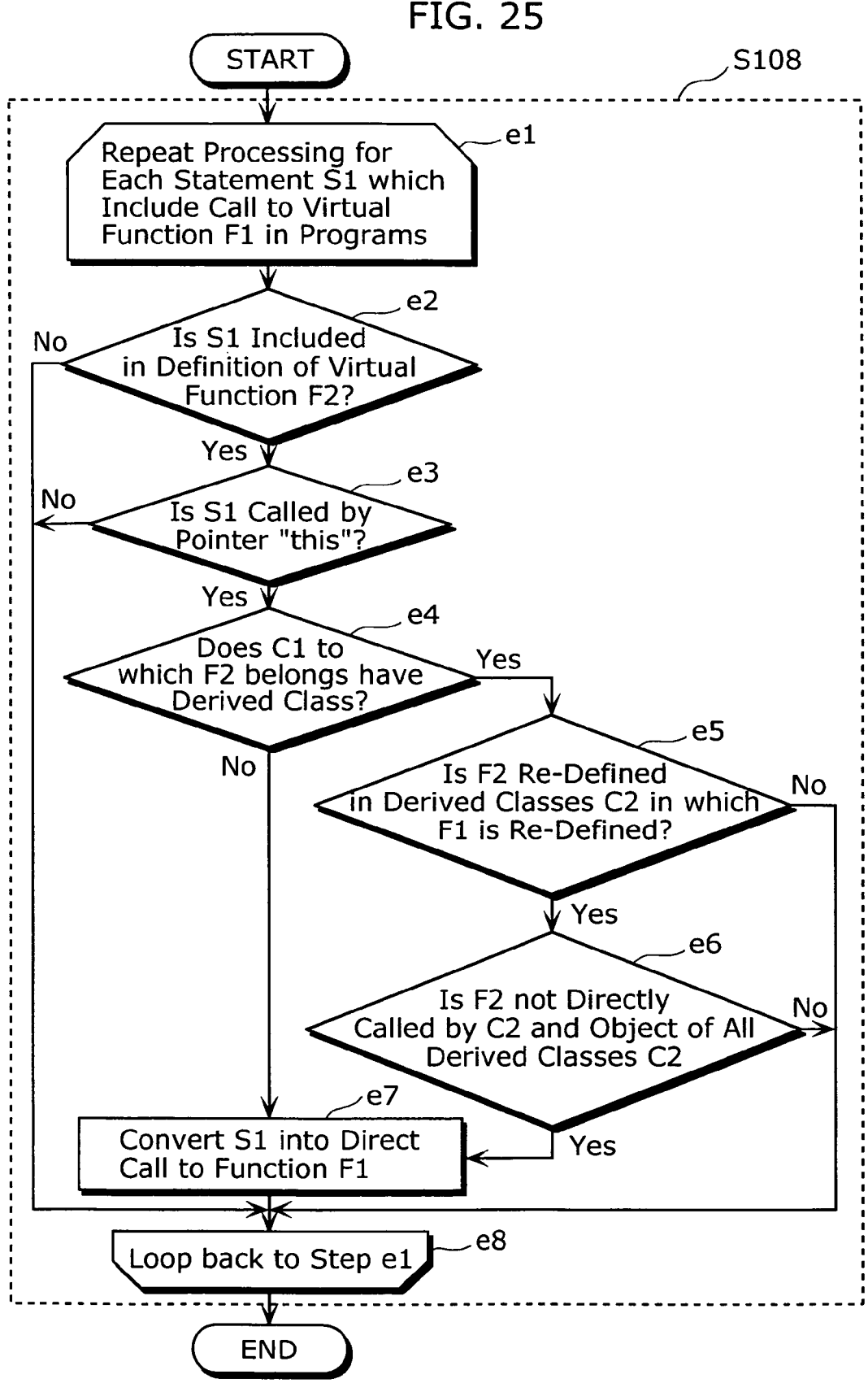
FIG. 25 is a flowchart of virtual function call conversion processing (S108) according to the second embodiment of the present invention.

Next, processing performed by the virtual function call conversion unit 108 in a case where the conversion is performed for the program 111 shown in FIG. 13 is described in more detail with reference to FIG. 25.

The virtual function call conversion processing (S108) which is performed by the virtual function call conversion unit 108 includes Steps e1 to e8. The following describes the virtual function call conversion processing (S108) in the step order.

At Step e1, the virtual function call conversion unit 108 repeats the following processing for all statements S1 which include virtual function calls in the respective programs 111. In FIG. 13, "this->g( );", "this->h( );", and the like are the statements to be converted.

At Step e2, the virtual function call conversion unit 108 analyzes whether or not the statement S1 is included in a definition of the virtual function F2. If the statement S1 is included in the definition of the virtual function F2, then the processing proceeds to Step e3, and if not, then the processing skips directly to Step e8. The statement "this->g( );" in FIG. 13 is included in a virtual function "A::f", so that a determination at Step e2 is "Yes" and the processing proceeds to Step e3. In the same manner, the statement "this->h( );" is included in a virtual function "B::g", so that the determination at Step e2 is "Yes" and the processing proceeds to Step e3. On the other hand, a statement "obj_c.g( );" is included in a function t, but the function t is not a virtual function, so that the determination at Step e2 is "No" and the processing skips directly to Step e8.

At Step e3, the virtual function call conversion unit 108 analyzes whether or not the statement Si is called by a pointer "this". If the statement SI is called by the pointer "this", then the processing proceeds to Step e4, and if not, then the processing skips directly to Step e8. In the statements "this->g( );" and "this->h( );" in FIG. 13, the virtual functions g and h are called by the pointer "this", so that a determination at Step e3 is "Yes" and the processing proceeds to Step e4.

At Step d4, the virtual function call conversion unit 108 analyzes, with reference to the class inheritance relationship information 113, whether or not the class C1 to which the virtual function F2 belongs has any derived classes. If the class C1 has any derived classes, then the processing proceeds to Step e5, and if not, then the processing skips directly to Step e7. In the virtual function "A::f" in FIG. 13, the class A to which the virtual function f belongs is understood to have a derived class, with reference to the class inheritance relationship information 113, so that a determination at Step e4 is "Yes" and the processing proceeds to Step e5. In the same manner, in the virtual function "B::g", the class B to which the virtual function g belongs is understood to have derived classes, so that the determination at Step e4 is "Yes".

At Step e5, the virtual function call conversion unit 108 analyzes whether or not the virtual function F2 is re-defined in the derived class C2 which is a derived class of the class C1 and in which the virtual function F1 is re-defined. If the virtual function F2 is re-defined in such a derived class, then the processing proceeds to Step e6, and if not, the processing skips directly to Step e8. In FIG. 13, with reference to the virtual function re-definition information 114, it is understood that a derived class of the class A in which a virtual function "A::g" is re-defined is only the class B, and also that the virtual function f is re-defined in the class B. Therefore, a determination at Step e5 is "Yes" and the processing proceeds to Step e6. On the other hand, a derived class of the class B in which a virtual function "A::h" is re-defined is only the class D, and the virtual function g is re-defined in the class D, so that the determination at Step e5 is "Yes".

Note that if the virtual function F1 is once re-defined in the derived class C2, it is no more necessary, at Step 5, to search other derived classes which inherit the class C2, since, even if the virtual function F1 is not re-defined in the derived classes which inherit the class C2, the virtual function F1 which is called from each derived class of the class C2 is the virtual function F1 in the class C2, so that the virtual function F1 is re-defined in the class C1.

At Step e6, the virtual function call conversion unit 108 analyzes whether or not the virtual function F2 is directly called by objects of the class C2 and all derived classes of the class C2. If the virtual function F2 is not directly called by objects of such classes, then the processing proceeds to Step e7, and if the virtual function F2 is directly called, then the processing skips directly to Step e8. In FIG. 13, with reference to the virtual function direct call information 115, it is understood that the virtual function f is not directly called by any objects of the class B and the classes C and D which are derived classes of the class B, so that the determination at Step e6 is "Yes" and the processing proceeds to Step e7. In the same manner, the virtual function g is directly called only by an object of the class C, and not called by any objects of the class D, so that the determination at Step e6 is "Yes".

At Step e7, the virtual function call conversion unit 108 converts the statement S1 into a direct call to the function F1. In the statement "this->g( );" in FIG. 13, the virtual function g is converted into a direct call, so that the virtual function g is converted into the same code as described as "this->A::g( );". In the same manner, the statement "this->h( );" is converted into a direct call, so that the statement is converted into the same code as described as "this->B::h( );".

At Step e8, in the virtual function call conversion unit 108, the processing loops back to Step el in order to repeat the above steps for other statements.

FIG. 26 is a diagram showing codes which are generated by converting the program 111 of FIG. 13 by the virtual function call conversion unit 108. By this cord, a virtual function A "A::g( )" and a virtual function B "B::h( )" are directly called.

As described above, by inputting the program 111 shown in FIG. 13 into the program converting apparatus 100 according to the second embodiment, it is possible to convert the statements "this->g( );" and "this->h( );" including virtual function calls, into direct calls to the functions. Thereby, it is possible to increase an execution speed during execution of the object program 112.

Note that the above second embodiment has described that the class inheritance relationship analysis processing (S104), the virtual function re-definition analysis processing (S105), the virtual function direct call analysis processing (S107), the virtual function call conversion processing (S108) are performed only once respectively, but it is possible to perform these processing for a plurality of times, if necessary.

Note also that it has been described that a type of the pointer "this" can be specified by the definition of the virtual function, when the virtual function and the class to which the virtual function belongs satisfy the specific conditions. However, in a constructor which generates class objects or a destructor which deletes the class objects, the pointer "this" can be specified to a class to which the constructor or the destructor belong. Therefore, it is possible to convert a virtual function call which is pointed by the pointer "this" described in the constructor or the destructor, into a direct function call.

Note also that, in a case where the type of the pointer "this" can be specified by characteristics of the program or by execution results of the program, it is possible to convert the virtual function call into the direct function call, based on a pragma directive, an option designation, execution history information, or the like.

Third Embodiment

In the third embodiment, in a case where the following conditions (1) to (4) are satisfied, it is possible to specify the pointer "this", so that a call to the virtual function F1 can be converted into a direct call to a function.

More specifically,

Condition (1): The virtual function F1 is described in a definition of a virtual function F2.

Condition (2): The virtual function F1 is called by the pointer "this".

Condition (3): The virtual function F2 is not directly called by any objects in derived classes of a class C1 to which the virtual function F2 belongs.

Condition (4): All virtual functions which are not re-defined in the derived classes are duplicated.

Figure 27:
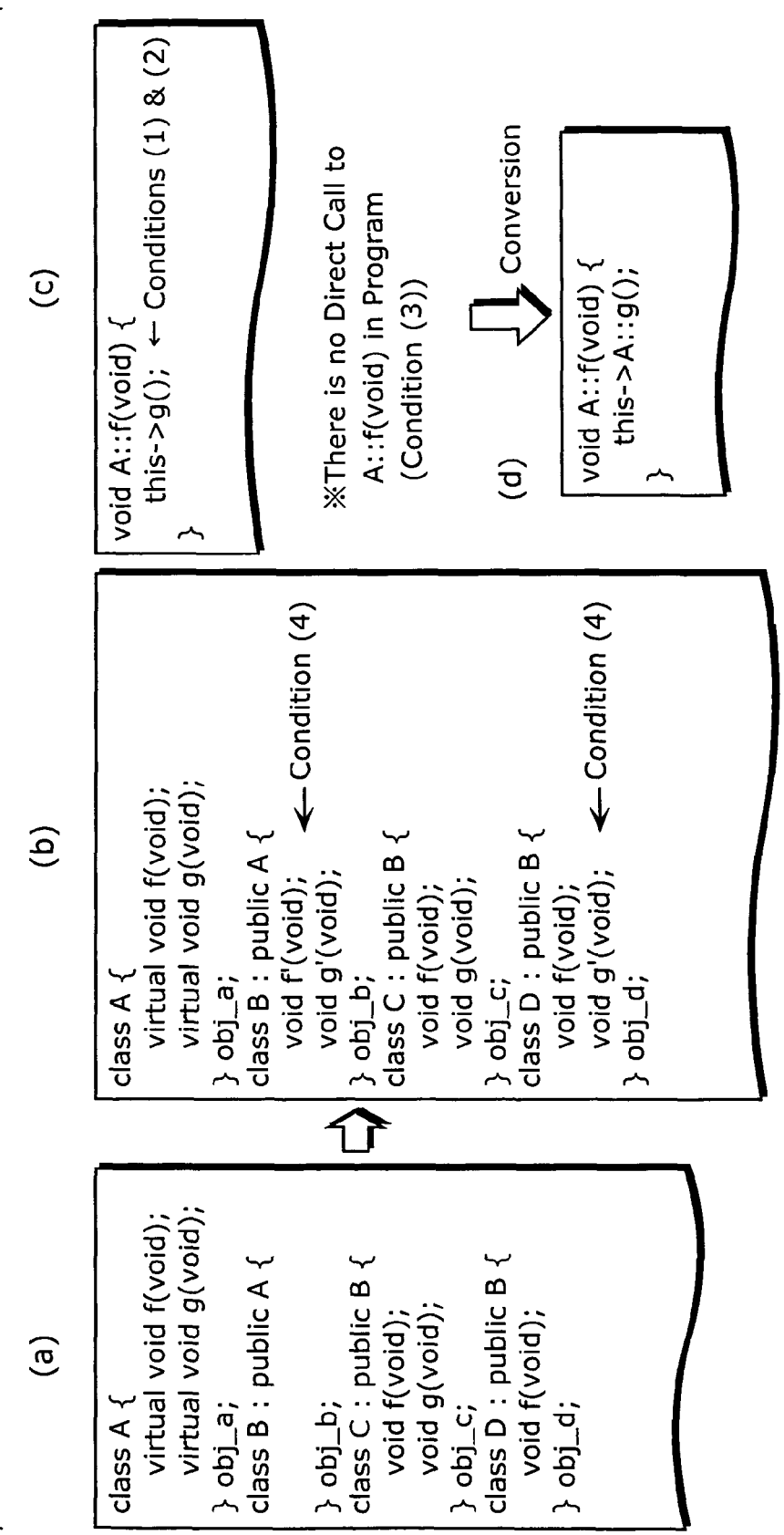
FIG. 27 is a schematic diagram explaining processing which is performed by a program converting apparatus according to the third embodiment of the present invention.

FIG. 27 is a schematic diagram explaining processing which is performed, based on the above-mentioned four conditions, by a program converting apparatus according to the third embodiment. Here, it is assumed that classes are defined as shown in (a) of FIG. 27, and a program is described as shown in (b) of FIG. 27.

In a case where a virtual function g is regarded as the virtual function F1, and a virtual function f is regarded as the virtual function F2, a statement "this->g( )" in (c) of FIG. 27 satisfies the conditions (1) and (2). More specifically, the virtual function F1 (virtual function g) is described in a definition of the virtual function F2 (virtual function f), which satisfies the condition (1). In addition, the virtual function F1 (virtual function g) is called by the pointer "this", which satisfies the condition (2).

Further, regarding the condition (3), there is no direct call to A::f(void) in the program. This means that the virtual function F2 (virtual function f) is not directly called by objects in the derived classes (classes B, C, and D) of the class C1 to which the virtual function F2 (virtual function f) belongs. Accordingly, this satisfies the condition (3).

In addition, all virtual functions which are not re-defined in the derived classes (classes B, C, and D) are duplicated. More specifically, as shown in (b) of FIG. 27, the virtual functions f and g are duplicated in the class B, and the virtual function g is duplicated in the Class D. Therefore, this satisfies the condition (4).

Accordingly, in the above case, it is possible to convert a call to the virtual function g as shown in (c) of FIG. 27 into a direct call to the virtual function g in the class A as shown in (d) of FIG. 27.

<Structure of Program Converting Apparatus>

Figure 28:
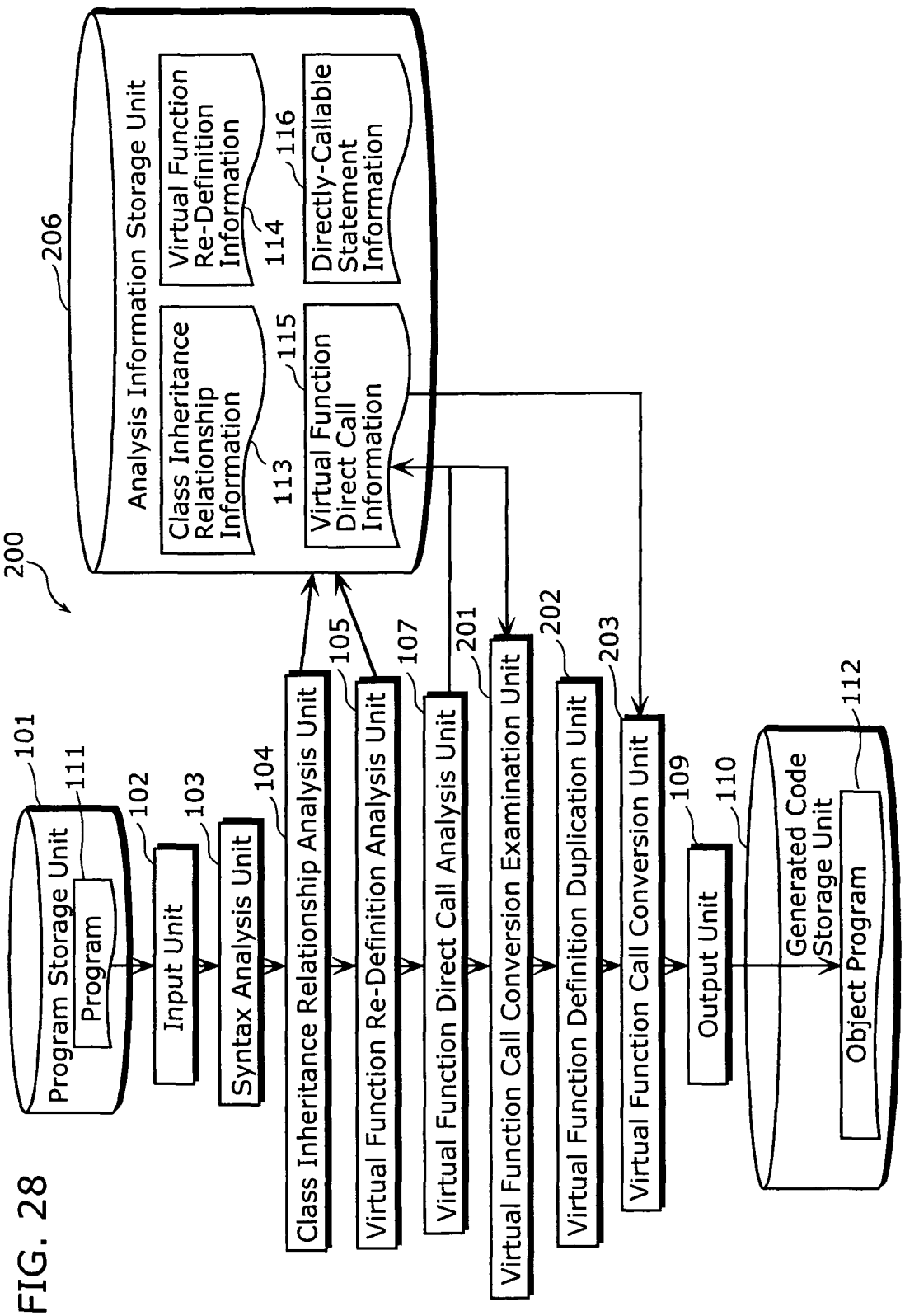
FIG. 28 is a diagram showing a structure of the program converting apparatus according to the third embodiment of the present invention.

FIG. 28 is a diagram showing a structure of a program converting apparatus 200 according to the third embodiment of the present invention. The program converting apparatus 200 includes the input unit 102, the syntax analysis unit 103, the class inheritance relationship analysis unit 104, the virtual function re-definition analysis unit 105, an analysis information storage unit 206, the virtual function direct call analysis unit 107, a virtual function call conversion examination unit 201, a virtual function definition duplication unit 202, a virtual function call conversion unit 203, and the output unit 109.

Among units included in the program converting apparatus 200, the program storage unit 101, the input unit 102, the syntax analysis unit 103, the class inheritance relationship analysis unit 104, the virtual function re-definition analysis unit 105, the virtual function direct call analysis unit 107, the output unit 109, and the generated code storage unit 110 perform the same processing as described for the program converting apparatus 100 according to the first embodiment as shown in FIG. 10. Therefore, the processing performed by these units are not described again herein below.

The virtual function call conversion examination unit 201 refers to the class inheritance relationship information 113 and the virtual function direct call information 115 which are stored in the analysis information storage unit 206, examines whether or not a virtual function call can be converted into a direct function call, and stores, into the analysis information storage unit 206, information regarding statements which include virtual function calls that can be converted into the direct function calls (hereinafter referred to as "directly-callable statement information").

The virtual function definition duplication unit 202 refers to the class inheritance relationship information 113 and the virtual function re-definition information 114 which are stored in the analysis information storage unit 206, then duplicates virtual functions which are not defined in derived classes, and converts the duplicated virtual functions into status which are re-defined in the derived classes.

The virtual function call conversion unit 203 converts, into direct calls to functions, statements which are included in the directly-callable statement information 116 that is stored in the analysis information storage unit 206.

The analysis information storage unit 206 is a storage device which stores information which is analyzed by each processing. More specifically, the analysis information storage unit 206 is a storage device which stores the class inheritance relationship information 113, the virtual function re-definition information 114, the virtual function direct call information 115, and the directly-callable statement information 116.

<Brief Description of Processing Performed by Program Converting Apparatus>

Figure 29:
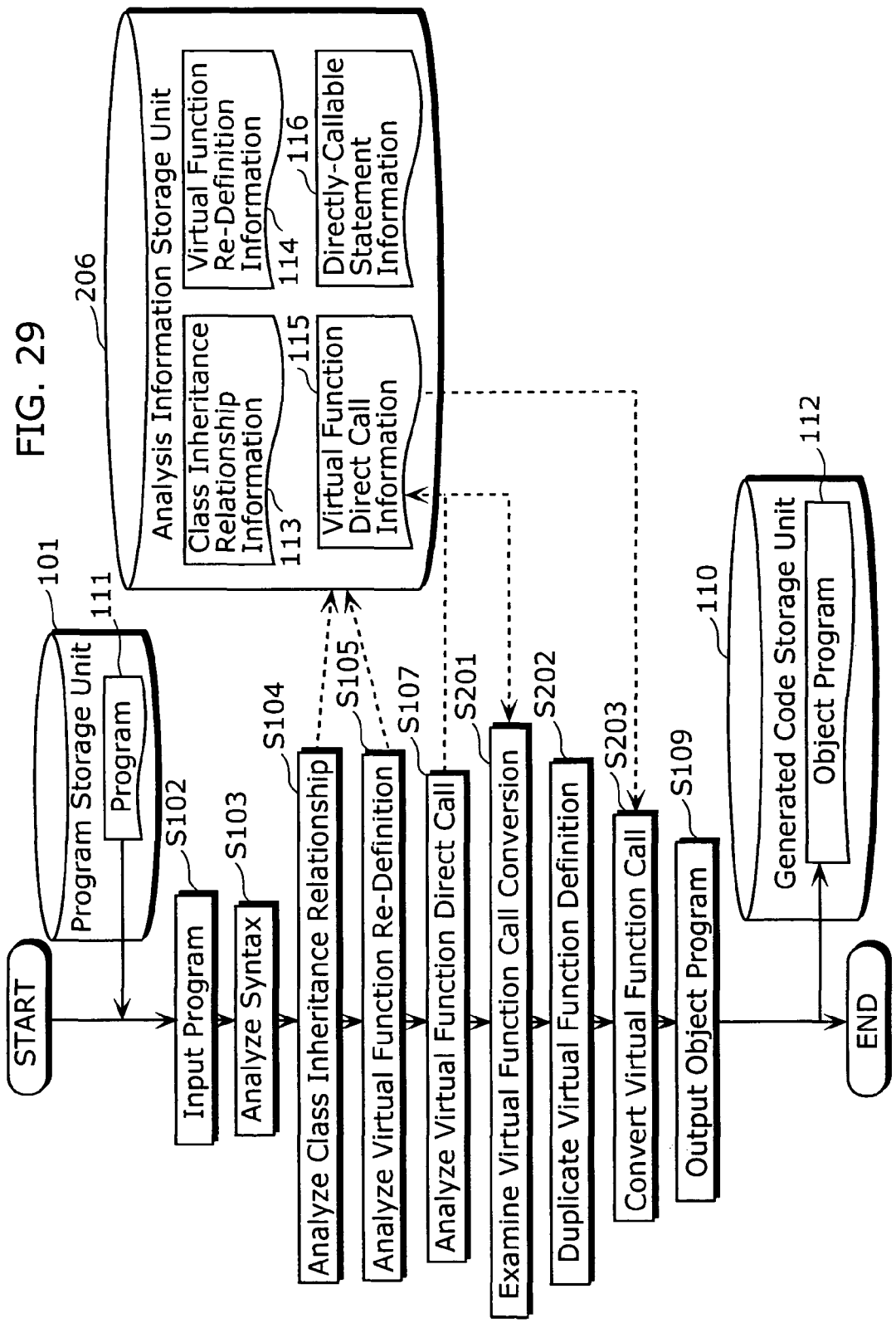
FIG. 29 is a diagram showing a structure of program converting processing according to the third embodiment of the present invention.

FIG. 29 is a flowchart of processing which is performed by the program converting apparatus 200 according to the third embodiment of the present invention.

In the flowchart, the input processing (S102), the syntax analysis processing (S103), the class inheritance relationship analysis processing (S104), the virtual function re-definition analysis processing (S105), the virtual function direct call analysis processing (S107), and the output processing (S109) are the same processing as described for the program converting apparatus 100 shown in FIG. 11. Therefore, those processing are not described again in detail herein below.

In virtual function call conversion examination processing (S201), the virtual function call conversion examination unit 201 refers to the class inheritance relationship information 113 and the virtual function direct call information 115 which are stored in the analysis information storage unit 206, examines whether or not a virtual function call can be converted into a direct function call, and stores resulting directly-callable statement information into the analysis information storage unit 206.

In the virtual function definition duplication processing (S202), the virtual function definition duplication unit 202 refers to the class inheritance relationship information 113 and the virtual function re-definition information 114 which are stored in the analysis information storage unit 206, then duplicates virtual functions which are not defined in derived classes, and converts the duplicated virtual functions into the status which are re-defined in the derived classes.

In virtual function call conversion processing (S203), the virtual function call conversion unit 203 converts, into direct calls to functions, statements which are included in the directly-callable statement information 116 that is stored in the analysis information storage unit 206.

<Details of Processing Performed by Program Converting Apparatus>

Next, processing performed by the program converting apparatus 200 is described in more detail with reference to the program 111 shown in FIG. 30.

Firstly, the input unit 102 inputs all programs 111 from the program storage unit 101 (S102), and the syntax analysis unit 103 creates syntax trees or symbol tables of the respective programs 111 (S103).

Next, the class inheritance relationship analysis unit 104 analyzes the classes included in the respective programs 111 and inheritance relationship among the classes, and stores results of the analysis into the class inheritance relationship information 113 (104). The class inheritance relationship analysis processing (S104) is the same processing as shown in FIG. 12. FIG. 31 shows the class inheritance relationship information 113 which is the results of analyzing the programs 111 of FIG. 30 by the class inheritance relationship analysis processing (S104).

Next, the virtual function re-definition analysis unit 105 analyzes the status which are re-defined for the virtual functions in the respective base classes, and stores results of the analysis into the virtual function re-definition information 114 (S105). The virtual function re-definition analysis processing (S105) is the same processing as shown in FIG. 15. FIG. 32 shows the virtual function re-definition information 114 which is the results of analyzing the programs 111 of FIG. 30 by the virtual function re-definition analysis processing (S105).

Next, the virtual function direct call analysis unit 107 analyzes virtual functions to be directly called, and stores results of the analysis into the virtual function direct call information 115 (S107). The virtual function direct call analysis processing (S107) is the same processing as shown in FIG. 17. FIG. 33 shows the virtual function direct call information 115 which is the results of analyzing the programs 111 of FIG. 30 by the virtual function direct call analysis processing (S107).

Figure 34:
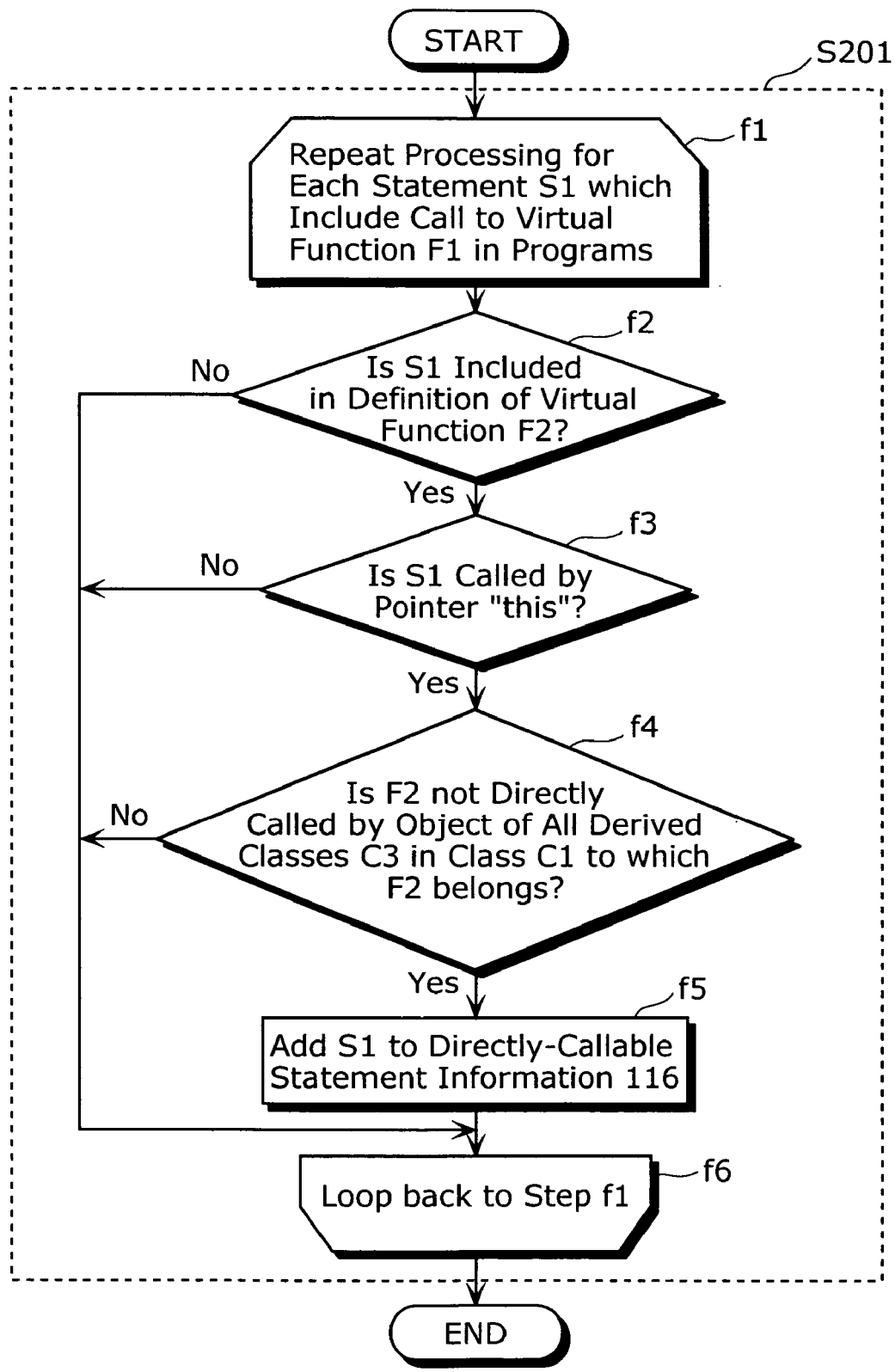
FIG. 34 is a flowchart of virtual function call conversion examination processing (S201)

Next, processing performed by the virtual function call conversion examination unit 201 in a case where the examination is made in the program 111 shown in FIG. 30 is described in more detail with reference to FIG. 34.

The virtual function call conversion examination processing (S201) which is performed by the virtual function call conversion examination unit 201 includes Steps f1 to f6. The following describes the virtual function call conversion examination processing (S201) in the step order.

At Step f1, the virtual function call conversion examination unit 201 repeats the following processing for all statements S1 which include virtual function calls in the respective programs 111. In FIG. 30, "this->g( );", "this->h( );", and the like are the statements to be examined.

At Step f2, the virtual function call conversion examination unit 201 examines whether or not the statement S1 is included in a definition of the virtual function F2. If the statement S1 is included in the definition of the virtual function F2, then the processing proceeds to Step f3, and if not, then the processing skips directly to Step f6. The statement "this->g( );" in FIG. 30 is included in a virtual function "A::f", so that a determination at Step f2 is "Yes" and the processing proceeds to Step f3. In the same manner, the statement "this->h( );" is included in a virtual function "B::g", so that the determination at Step f2 is "Yes" and the processing proceeds to Step f3. On the other hand, a statement "obj_c.g( );" is included in a function t, but the function t is not a virtual function, so that the determination at Step f2 is "No" and the processing skips directly to Step f6.

At Step f3, the virtual function call conversion examination unit 201 examines whether or not the statement S1 is called by a pointer "this". If the statement S1 is called by the pointer "this", then the processing proceeds to Step f4, and if not, then the processing skips directly to Step f6. In the statements "this->g( );" and "this->h( );" in FIG. 30, the virtual functions g and h are called by the pointer "this", so that a determination at Step f3 is "Yes" and the processing proceeds to Step f4.

At Step f4, the virtual function call conversion examination unit 201 examines whether or not the virtual function F2 is directly called by any object in all derived classes C3 of the class C1 to which the virtual function F2 belongs. If the virtual function F2 is not directly called by such an object, then the processing proceeds to Step f5, and if the virtual function F2 is directly called by such an object, then the processing skips directly to Step f6. In FIG. 30, with reference to the virtual function direct call information 115, it is understood that the virtual function "A::f" is not directly called by any object in all derived classes B, C, and D of the class A, so that a determination at Step f4 is "Yes" and the processing proceeds to Step f5. On the other hand, in a case where the above examination is made for virtual function "B::g", the virtual function "B::g" is directly called by an object of the class C, so that the determination at Step f4 is "No" and the processing skips directly to Step f6.

At Step f5, the virtual function call conversion examination unit 201 adds the statement S1 into the directly-callable statement information 116. In FIG. 30, the statement "this->g( );" is added to the directly-callable statement information 116.

At Step f6, in the virtual function call conversion examination unit 201, the processing loops back to Step f1 in order to repeat the above steps for other statements.

Figure 35:
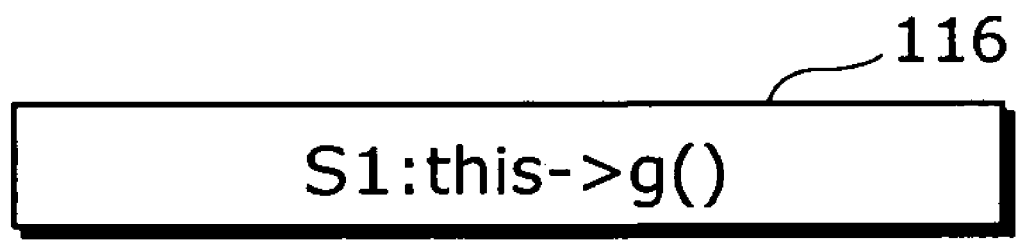
FIG. 35 is a diagram showing direct call possible statement information 116 according to the third embodiment of the present invention.

FIG. 35 is a diagram showing the directly-callable statement information 116 which is the results from analyzing the program 111 of FIG. 30 in the virtual function call conversion examination processing (S201) which is performed by the virtual function call conversion examination unit 201.

Figure 36:
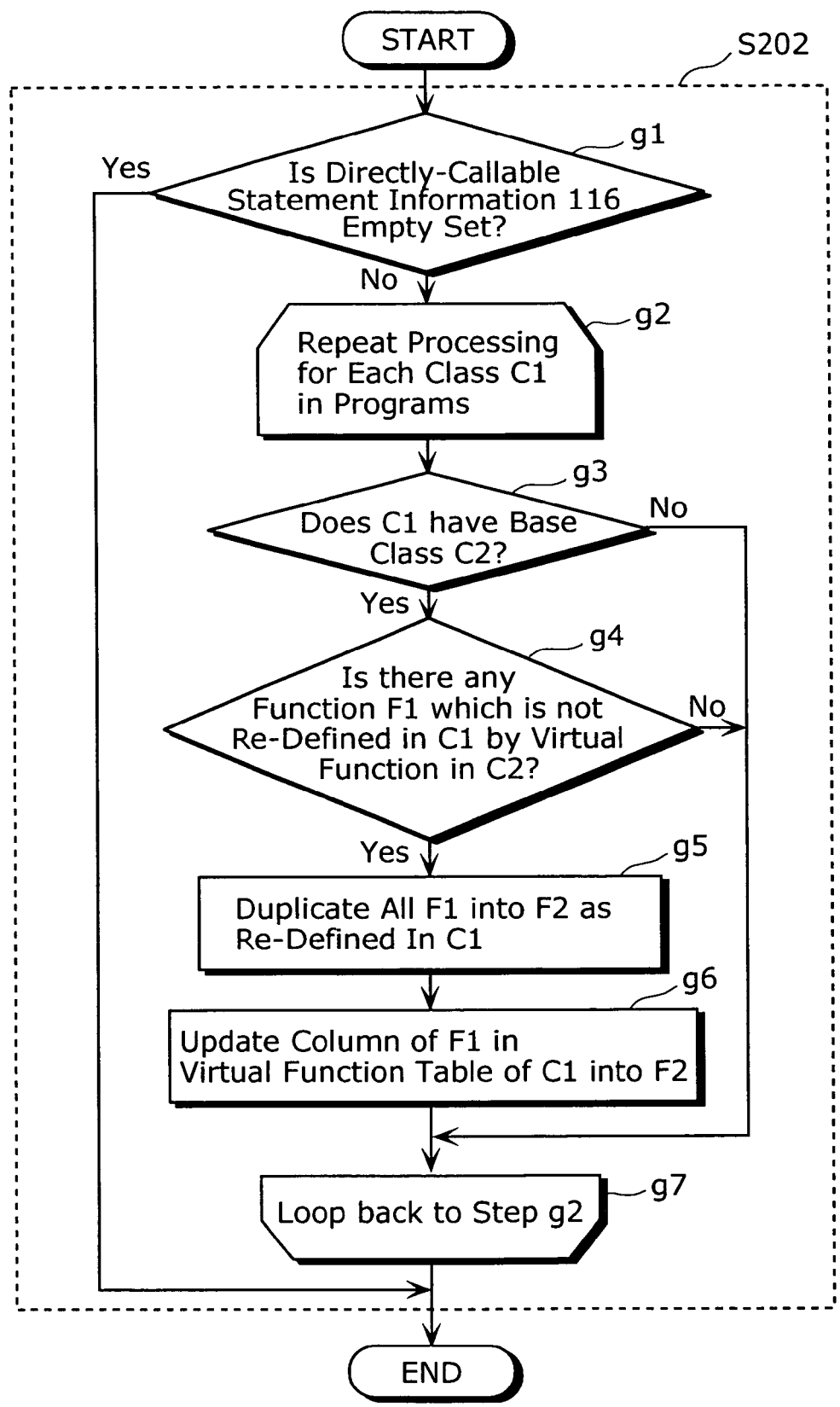
FIG. 36 is a flowchart of virtual function definition duplication processing (S202)

Next, the virtual function definition duplication processing (S202) which is performed by the virtual function definition duplication unit 202 in a case where the duplication is performed for the program 111 shown in FIG. 30 is described in more detail with reference to FIG. 36.

The virtual function definition duplication processing (S202) which is performed by the virtual function definition duplication unit 202 includes Steps g1 to g7. The following describes the virtual function definition duplication processing (S202) in the step order.

At Step g1, the virtual function definition duplication unit 202 analyzes whether or not the directly-callable statement information 116 is an empty set. If the directly-callable statement information 116 is an empty set, then the virtual function definition duplication processing completes, and if not, then the processing proceeds to Step g2. In the program 111 of FIG. 13, the directly-callable statement information 116 is not an empty set, so that a determination at Step g1 is "No" and the processing proceeds to Step g2.

At Step g2, the virtual function definition duplication unit 202 repeats the following processing for all classes C1 which are included in the respective programs 111. In other words, the following processing are repeated for the classes A, B, C, and D which are included in all programs 111 as shown in FIG. 30.

At Step g3, the virtual function definition duplication unit 202 analyzes whether or not the class C1 has a base class C2 from which the class C1 is derived. If the class C1 has such a base class C2, then the processing proceeds to Step g4, and if not, then the processing skips directly to Step g7. In a case of the class A of FIG. 30, the class A does not have any base classes, so that a determination at Step g3 is "No" and the processing skips directly to Step g7. On the other hand, in a case of the class B, the class B has the class A as the base class, the determination at Step g3 is "Yes" and the processing proceeds to Step g4. The classes C and D also have the class B as the base class, so that the determination at Step g3 is "Yes" and the processing proceeds to Step g4.

At Step g4, the virtual function definition duplication unit 202 analyzes whether or not there is any virtual function F1 which is a virtual function in the class C2 and which is not re-defined in the class C1. If there is such a virtual function F1, then the processing proceeds to Step g5, and if such a virtual function does not exist, then the processing skips directly to Step g7. In a case of the class B in FIG. 30, with reference to the virtual function re-definition information 114, it is understood that the virtual functions f and h in the base class A are not re-defined in the derived classes, so that a determination at Step g4 is "Yes" and the processing proceeds to Step g5. In the same manner, in case of classes B, C, and D, some of virtual functions in the B class are not defined in the respective derived classes, so that the determination at Step g4 is "Yes".

At Step g5, the virtual function definition duplication unit 202 duplicates the virtual function F1 in the class C2 to generate the virtual function F2, so that a definition of the virtual function in the class C1 is converted into a status which is re-defined in the class C1. In a case of the class B of FIG. 30, the virtual functions f and h in the base class A are duplicated to generate virtual functions f' and h', and the definitions of those virtual functions in the class B are converted as the re-definitions in the class B. In cases of the classes C and D, the virtual function in the base class B is duplicated and the definition of the virtual function in each class is converted, in the same manner as described the above.

At Step g6, the virtual function definition duplication unit 202 replaces a column of the virtual function F1 in the virtual function table of the class C1. In a case of the class B of FIG. 30, the columns of the virtual functions f and h in the virtual function table of the class B are "A:: f(void)" and "A::h(void)", respectively, but the columns are rewritten to as duplicated functions "B::f'(void)" and "B::h'(void)", respectively. In the same manner, the columns in the virtual function tables of the classes C and D are also rewritten to respective duplicated functions.

At Step g7, in the virtual function definition duplication unit 202, the processing loops back to Step g2 in order to repeat the Steps from g2 to g7 for other classes.

FIGS. 37 and 38 show a program and a virtual function table of each class, respectively, which are generated by converting the program 111 of FIG. 30 in the virtual function definition duplication processing (S202).

Next, virtual function call conversion processing (S203) which is performed by the virtual function call conversion unit 203 in a case where conversion is performed for the program 111 shown in FIG. 30 is described with reference to FIG. 39.

The virtual function call conversion processing (S203) which is performed by the virtual function call conversion unit 203 includes Steps h1 to h3. The following describes the virtual function call conversion processing (S203) in the step order.

At Step h1, virtual function call conversion unit 203 repeats the following processing for all statements S1 which are included in the directly-callable statement information 116. In the program 111 of FIG. 30, a statement "this->g( );" which is included in the directly-callable statement information 116 is to be converted.

At Step h2, the virtual function call conversion unit 203 converts a virtual function call included in the statement S1 into a direct function call. In FIG. 30, a virtual function call in the statement "this->g( );" is converted into a direct function call, so that the statement is converted into the same code as described as "this->A::g( );".

At Step h3, in the virtual function call conversion unit 203, the processing loops back to Step h1 in order to repeat the above steps for other statements.

Figures 39, 40:
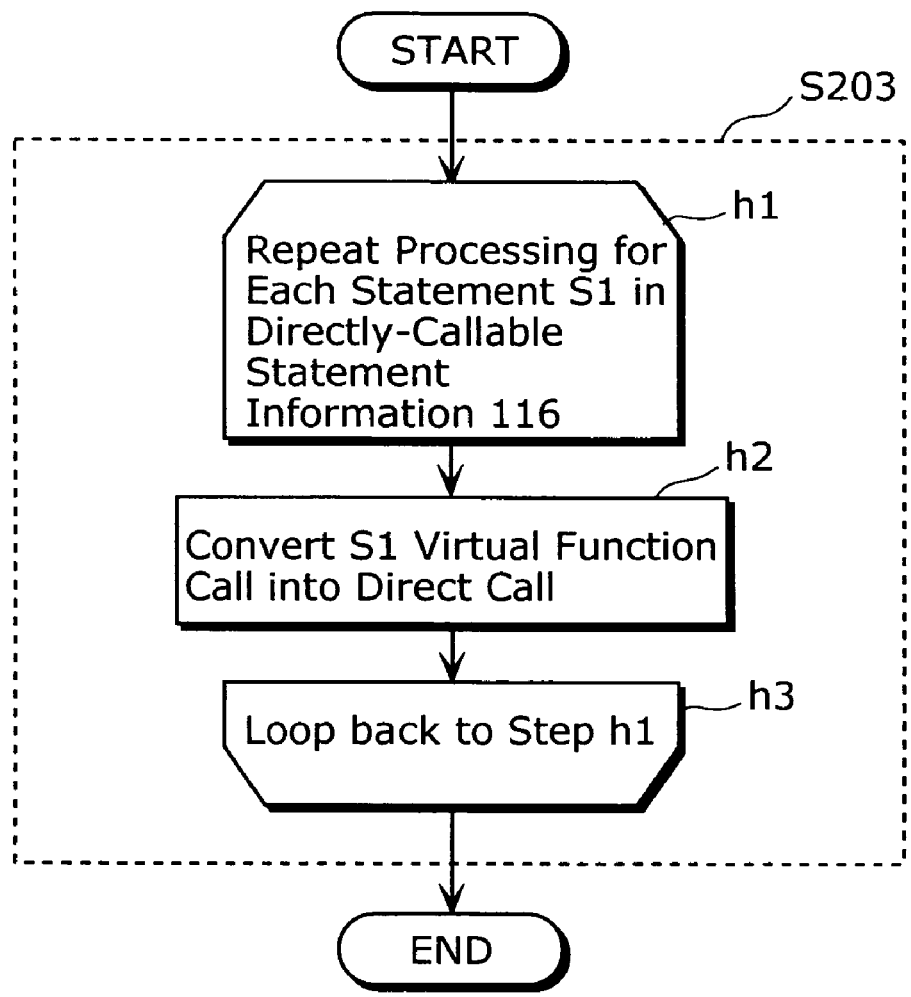
FIG. 39 is a flowchart of virtual function call conversion processing (S203)
FIG. 40 is a diagram showing a program which is generated by the virtual function call conversion processing according to the third embodiment of the present invention.

FIG. 40 is a diagram showing a code which is generated by converting the program 111 of FIG. 30 in the virtual function call conversion processing (S203).

As described above, by inputting the program 111 shown in FIG. 30 into the program converting apparatus 200 according to the third embodiment, it is possible to convert the statement "this->g( );" including a virtual function call, into a direct call to the function. Thereby, it is possible to increase an execution speed during execution of the object program 112.

Note that the above embodiment has described that the class inheritance relationship analysis processing (S104), the virtual function re-definition analysis processing (S105), the virtual function direct call analysis processing (S107), the virtual function call conversion examination processing (S201), the virtual function definition duplication processing (S202), and the virtual function call conversion processing (S203) are performed only once respectively, but it is possible to perform these processing for a plurality of times, if necessary.

Note also that it has been described that a type of the pointer "this" can be specified by the definition of the virtual function, when the virtual function and the class to which the virtual function belongs satisfy the specific conditions. However, in a constructor which generates class objects or a destructor which deletes the class objects, the pointer "this" can be specified to a class to which the constructor or the destructor belong. Therefore, it is possible to convert a virtual function call which is pointed by the pointer "this" described in the constructor or the destructor, into a direct function call.

Note also that, in a case where the type of the pointer "this" can be specified by characteristics of the program or by execution results of the program, it is possible to convert the virtual function call into the direct function call, based on a pragma directive, an option designation, execution history information, or the like.

Fourth Embodiment

The fourth embodiment differs from the third embodiment in processing which are performed by the virtual function call conversion examination unit 201 and the virtual function definition duplication unit 202. The virtual function call conversion examination processing (S201) which is performed by the virtual function call conversion examination unit 201, and the virtual function definition duplication processing (S202) which is performed by the virtual function definition duplication unit 202 will be described further below.

Note that the analysis information storage unit 206 stores duplicated virtual function information (not shown). The duplicated virtual function information will be described further below.

In the fourth embodiment, in a case where the following conditions (1) to (4) are satisfied, it is possible to specify the pointer "this", so that a call to the virtual function F1 can be converted into a direct call to a function.

More specifically,

Condition (1): The virtual function F1 is described in a definition of a virtual function F2.

Condition (2): The virtual function F1 is called by the pointer "this".

Condition (3): The virtual function F2 is not directly called by any objects in derived classes to which the virtual function F2 belongs, except a class 1.

Condition (4): All virtual functions F2 which are not re-defined in the derived classes of the class 1 are duplicated.

Figure 41:
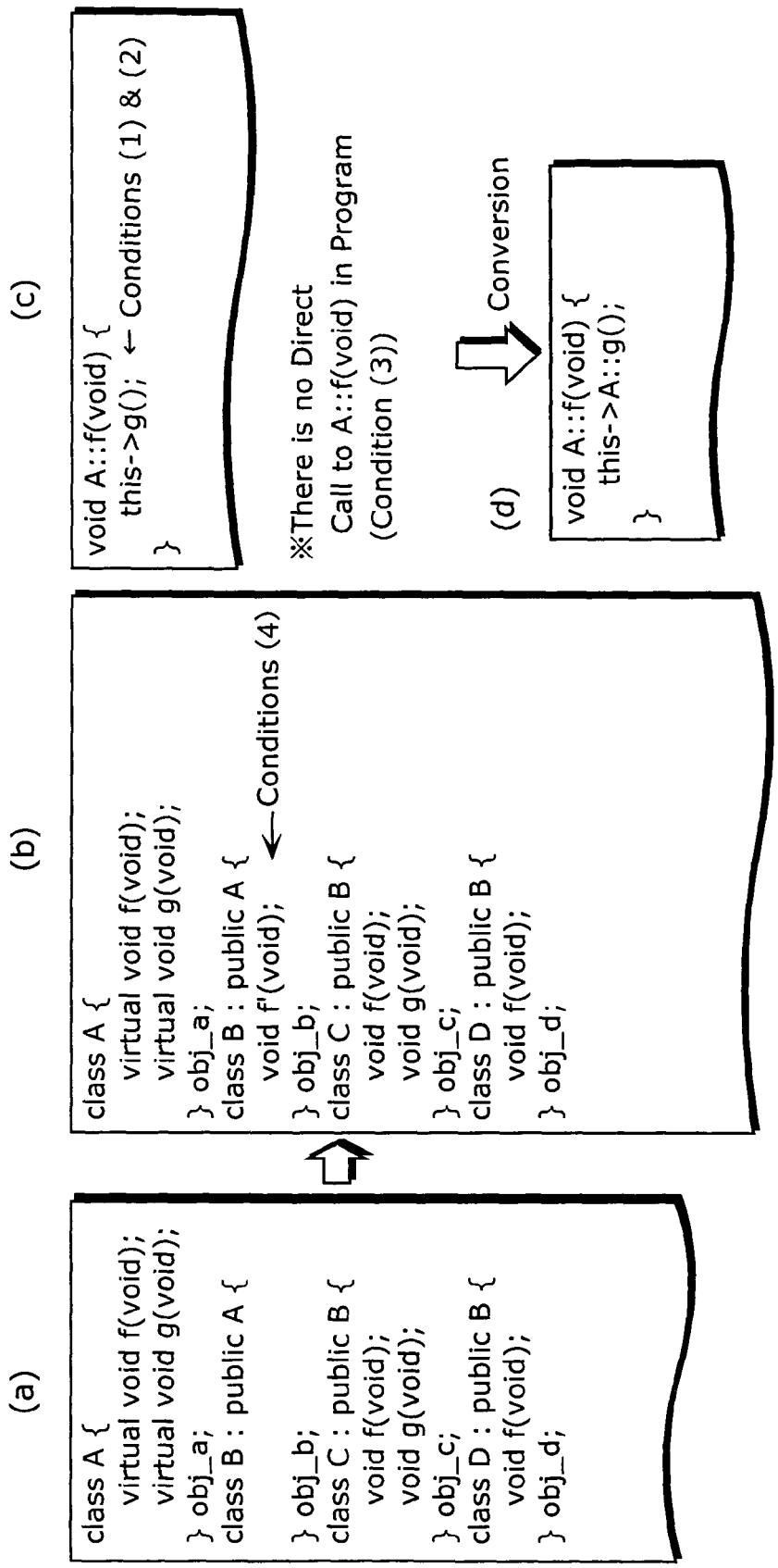
FIG. 41 is a schematic diagram explaining processing which is performed by a program converting apparatus according to the fourth embodiment of the present invention.

FIG. 41 is a schematic diagram explaining processing which is performed, based on the above-mentioned four conditions, by a program converting apparatus according to the fourth embodiment. Here, it is assumed that classes are defined as shown in (a) of FIG. 41, and a program is described as shown in (c) of FIG. 41.

In a case where a virtual function g is regarded as the virtual function F1, and a virtual function f is regarded as the virtual function F2, a statement "this->g( )" in (c) of FIG. 41 satisfies the conditions (1) and (2). More specifically, the virtual function F1 (virtual function g) is described in a definition of the virtual function F2 (virtual function f), which satisfies the condition (1). In addition, the virtual function F1 (virtual function g) is called by the pointer "this", which satisfies the condition (2).

Further, regarding the condition (3), there is no direct call to A::f in the program. This means that the virtual function F2 (virtual function g) is not directly called by objects in the derived classes (classes B, C, and D) to which the virtual function F2 (virtual function g) belongs, except the class C1 (class A). Accordingly, this satisfies the condition (3).

In addition, all virtual functions F2 (virtual functions f) which are not re-defined in the derived class (class B) of the class C1 (class A) are duplicated. More specifically, as shown in (b) of FIG. 41, the virtual function f is duplicated in the class B. Therefore, this satisfies the condition (4).

Accordingly, in the above case, it is possible to convert a call to the virtual function g as shown in (c) of FIG. 41 into a direct call to the virtual function g in the class A as shown in (d) of FIG. 41.

The following describes processing which is performed by the program converting apparatus 200 according to the fourth embodiment with reference to examples of the program.

Firstly, the input unit 102 inputs all programs 111 from the program storage unit 101 (S102), and the syntax analysis unit 103 creates syntax trees or symbol tables of the respective programs 111 (S103).

Next, the class inheritance relationship analysis unit 104 analyzes the classes included in the respective programs and inheritance relationships among the classes, and stores results of the analysis into the class inheritance relationship information 113 (S104). The class inheritance relationship analysis processing (S104) is the same processing as shown in FIG. 12. FIG. 42 shows the class inheritance relationship information 113 which is the results of analyzing the programs 111 of FIG. 30 by the class inheritance relationship analysis processing (S104).

Next, the virtual function re-definition analysis unit 105 analyzes status of re-definition of virtual functions in the respective base classes, and stores results of the analysis into the virtual function re-definition information 114 (S105). The virtual function re-definition analysis processing (S105) is the same processing as shown in FIG. 15. FIG. 43 shows the virtual function re-definition information 114 which is the results of analyzing the programs 111 of FIG. 30 by the virtual function re-definition analysis processing (S105).

Next, the virtual function direct call analysis unit 107 analyzes virtual functions to be directly called, and stores the results of the analysis into the virtual function direct call information 115 (S107). The virtual function direct call analysis processing (S107) is the same processing as shown in FIG. 17. FIG. 44 shows the virtual function direct call information 115 which is the results of analyzing the programs 111 of FIG. 30 by the virtual function direct call analysis processing (S107).

Figure 45:
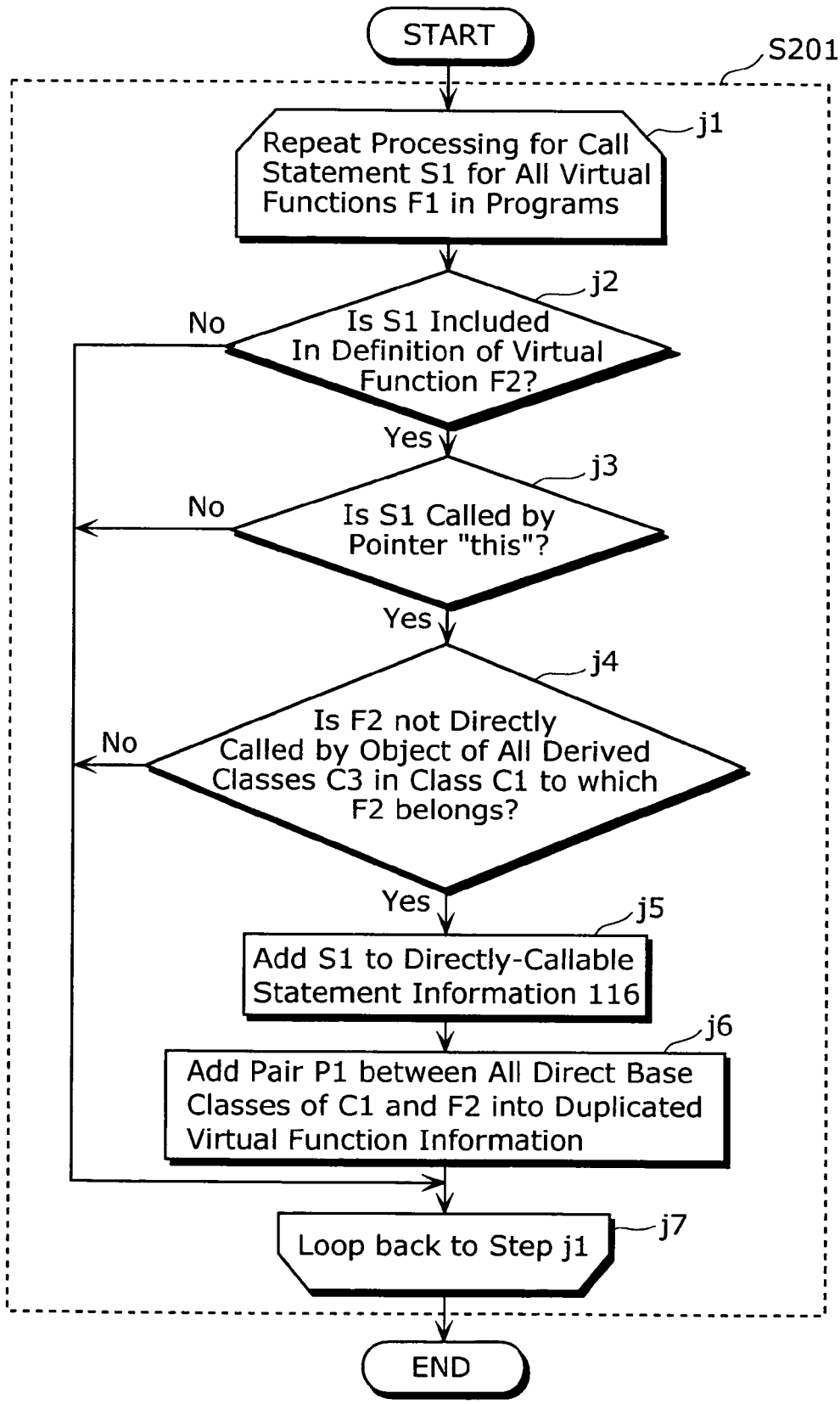
FIG. 45 is a flowchart of virtual function call conversion examination processing (S201) according to the fourth embodiment of the present invention.

Next, the virtual function call conversion examination processing (S201) which is performed by the virtual function call conversion examination unit 201 in a case where the examination is performed for the program 111 shown in FIG. 30 is described in more detail with reference to FIG. 45.

The virtual function call conversion examination processing (S201) includes Steps i1 to i7. The following describes the virtual function call conversion examination processing (S201) in the step order.

At Step j1, the virtual function call conversion examination unit 201 repeats the following processing for all statements S1 which include virtual function calls in the respective programs 111. In FIG. 30, "this->g( );", "this->h( );", and the like are the statements to be examined.

At Step j2, the virtual function call conversion examination unit 201 examines whether or not the statement S1 is included in a definition of the virtual function F2. If the statement S1 is included in the definition of the virtual function F2, then the processing proceeds to Step j3, and if not, then the processing skips directly to Step j7. The statement "this->g( );" in FIG. 30 is included in a virtual function "A::f", so that a determination at Step j2 is "Yes" and the processing proceeds to Step j3. In the same manner, the statement "this->h( );" is included in a virtual function "B::g", so that the determination at Step j2 is "Yes" and the processing proceeds to Step j3. On the other hand, a statement "obj_c.g( );" is included in a function t, but the function t is not a virtual function, so that the determination at Step j2 is "No" and the processing skips directly to Step j7.

At Step j3, the virtual function call conversion examination unit 201 examines whether or not the statement S1 is called by a pointer "this". If the statement S1 is called by the pointer "this", then the processing proceeds to Step j4, and if not, then the processing skips directly to Step j7. In the statements "this->g( );" and "this->h( );" in FIG. 30, the virtual functions g and h are called by the pointer "this", so that a determination at Step j3 is "Yes" and the processing proceeds to Step j4.

At Step j4, the virtual function call conversion examination unit 201 examines whether or not the virtual function F2 is directly called by any object in all derived classes C3 of the class C1 to which the virtual function F2 belongs. If the virtual function F2 is not directly called by such an object, then the processing proceeds to Step j5, and if the virtual function F2 is directly called by such an object, then the processing skips directly to Step j7. In FIG. 30, with reference to the virtual function direct call information 115, it is understood that the virtual function "A::f" is not directly called by any object in all derived classes B, C, and D of the class A, so that a determination at Step j4 is "Yes" and the processing proceeds to Step j5. On the other hand, in a case where the above examination is made for virtual function "B::g", the virtual function "B::g" is directly called by an object of the class C, so that the determination at Step j4 is "No" and the processing skips directly to Step j7.

At Step j5, the virtual function call conversion examination unit 201 adds the statement S1 into the directly-callable statement information 116. In FIG. 30, the statement "this->g( );" is added to the directly-callable statement information 116.

At Step j6, the virtual function call conversion examination unit 201 adds a pair P1 of each direct base class of the class C1 and the virtual function F2, as duplicated virtual function information, into the analysis information storage unit 206. In FIG. 30, the direct base class of the class A is only the class B, so that a pair of the class B and the virtual function A::f is added to the duplicated virtual function information. In a case where there are a plurality of the direct base classes, a plurality of pairs are added to the duplicated virtual function information.

At Step j7, in the virtual function call conversion examination unit 201, the processing loops back to Step j1 in order to repeat the above steps for other statements.

Figure 46:
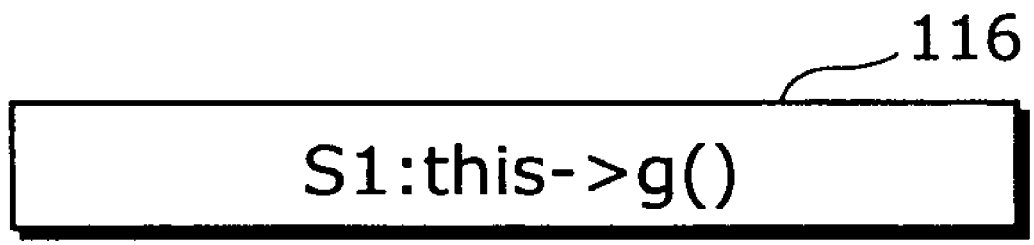
FIG. 46 is a diagram showing direct call possible statement information 116 according to the fourth embodiment of the present invention.
Figure 47:
FIG. 47 is a diagram showing duplicated virtual function information according to the fourth embodiment of the present invention.

FIGS. 46 and 47 show the directly-callable statement information 116 and the duplicated virtual function information, respectively, which are the results of analyzing the program 111 of FIG. 30 in the virtual function call conversion examination processing (S201).

Figure 48:
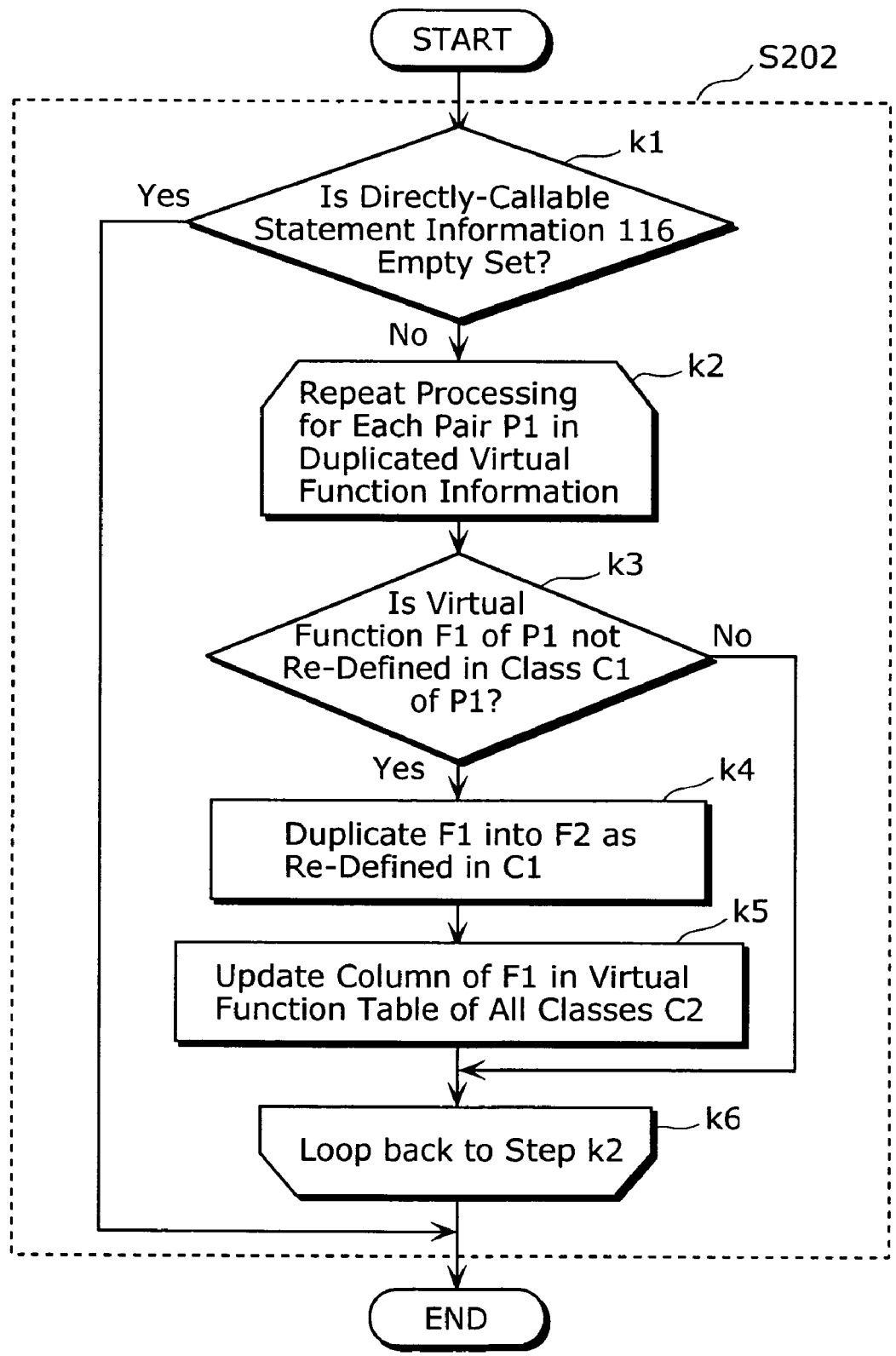
FIG. 48 is a flowchart showing virtual function definition duplication processing (S202) according to the fourth embodiment of the present invention.

Next, the virtual function definition duplication processing (S202) which is performed by the virtual function definition duplication unit 202 in a case where the duplication is performed for the program 111 shown in FIG. 30 is described in more detail with reference to FIG. 48.

The virtual function definition duplication processing (S202) includes Steps k1 to k6. The following describes the virtual function definition duplication processing (S202) in the step order.

At Step k1, the virtual function definition duplication unit 202 examines whether or not the directly-callable statement information 116 is an empty set. If the directly-callable statement information 116 is an empty set, then the virtual function definition duplication processing (S202) completes, and if not, then the processing proceeds to Step k2. In the program 111 of FIG. 30, the directly-callable statement information 116 is not an empty set, so that a determination at Step k1 is "No" and the processing proceeds to Step k2.

At Step k2, the virtual function definition duplication unit 202 repeats the following processing for all pairs P1 in the duplicated virtual function information. In FIG. 30, the following processing is repeated for a pair of the class B and the virtual function "A::f".

At Step k3, the virtual function definition duplication unit 202 examines whether or not the virtual function F1 in the pair P1 is re-defined in the class C1 in the pair P1. If the virtual function F1 is not re-defined, then the processing proceeds to Step k4, and if the virtual function F1 is re-defined, then the processing skips directly to Step k6. In a case of the class B in the pair P1 in FIG. 30, with reference to the virtual function re-definition information 114, it is understood that the virtual function "A::f" in the pair P1 is not re-defined in the class B, so that a determination at Step k3 is "Yes" and the processing proceeds to Step k4.

At Step k4, the virtual function definition duplication unit 202 duplicate the virtual function F1 to generate the virtual function F2, and converts the definition of the virtual function in the class C1 into a status which is re-defined in the class C1. In a case of the class B of FIG. 30, the virtual function "A::f" is duplicated to generate a virtual function f', and a definition of the virtual function in the class B is converted as the re-definition in the class B.

At Step k5, the virtual function definition duplication unit 202 replaces, with the virtual function F2, columns in the virtual function tables of all classes C1 in which the virtual functions F1 are recorded. In FIG. 30, a column of the virtual function f "A::f(void)" in the virtual function tables of the classes B, C, and D are to be replaced with a duplicated function "B::f'(void)".

At Step k6, in the virtual function definition duplication unit 202, the processing loops back to Step k2 in order to repeat the Steps from k2 to k6 for other pairs.

FIGS. 49 and 50 show a program and virtual function tables of the respective classes, respectively, which are generated by converting the program 111 of FIG. 30 in the virtual function definition duplication processing (S202) which is performed by the virtual function definition duplication unit 202.

Next, the virtual function call conversion unit 203 converts a virtual function call into a direct function call (S203). The virtual function call conversion processing (S203) is the same processing shown in FIG. 39. FIG. 51 shows a code which is generated by converting the program 111 of FIG. 30 by the virtual function call conversion processing (S203).

As described above, by inputting the program 111 shown in FIG. 30 into the program converting apparatus 200 according to the fourth embodiment, it is possible to convert the statement "this->g( );" including a virtual function call, into a direct call to the function. Thereby, it is possible to increase an execution speed during execution of the object program 112. Moreover, the program converting apparatus 200 duplicates minimum virtual functions which need to execute a program. Thereby, it is at least possible to prevent an enlargement of a size of the code of the object program 112.

Note that the above embodiment has described that the class inheritance relationship analysis processing (S104), the virtual function re-definition analysis processing (S105), the virtual function direct call analysis processing (S107), a virtual function call conversion examination processing (S201), a virtual function definition duplication processing (S202), and a virtual function call conversion processing (S203) are performed only once respectively, but it is possible to perform these processing for a plurality of times, if necessary.

Note also that it has been described that a type of the pointer "this" can be specified by the definition of the virtual function, when the virtual function and the class to which the virtual function belongs satisfy the specific conditions. However, in a constructor which generates class objects or a destructor which deletes the class objects, the pointer "this" can be specified to a class to which the constructor or the destructor belong. Therefore, it is possible to convert a virtual function call which is pointed by the pointer "this" described in the constructor or the destructor, into a direct function call.

Note also that, in a case where the type of the pointer "this" can be specified by characteristics of the program or by execution results of the program, it is possible to convert the virtual function call into the direct function call, based on a pragma directive, an option designation, execution history information, or the like.

Fifth Embodiment

A program converting apparatus 200 according to the fifth embodiment differs from the program converting apparatus according to the fourth embodiment in processing which is performed by the virtual function call conversion examination unit 201. The virtual function call conversion examination processing (S201) which is performed by the virtual function call conversion examination unit 201 will be described further below.

In the fifth embodiment, in a case where the following conditions (1) to (4) are satisfied, it is possible to specify a pointer "this", so that a call to a virtual function F1 can be converted into a direct call to a function.

More specifically,

Condition (1): The virtual function F1 is described in a definition of a virtual function F2.

Condition (2): The virtual function F1 is called by the pointer "this".

Condition (3): The virtual function F2 is not directly called by any objects in a class that is a derived class of a class C1 to which the virtual function F2 belongs and that is not a class C2 in which the virtual function F1 is not defined.

Condition (4): All virtual functions F2 which are not re-defined in the derived class except the class C2 are duplicated.

Figure 52:
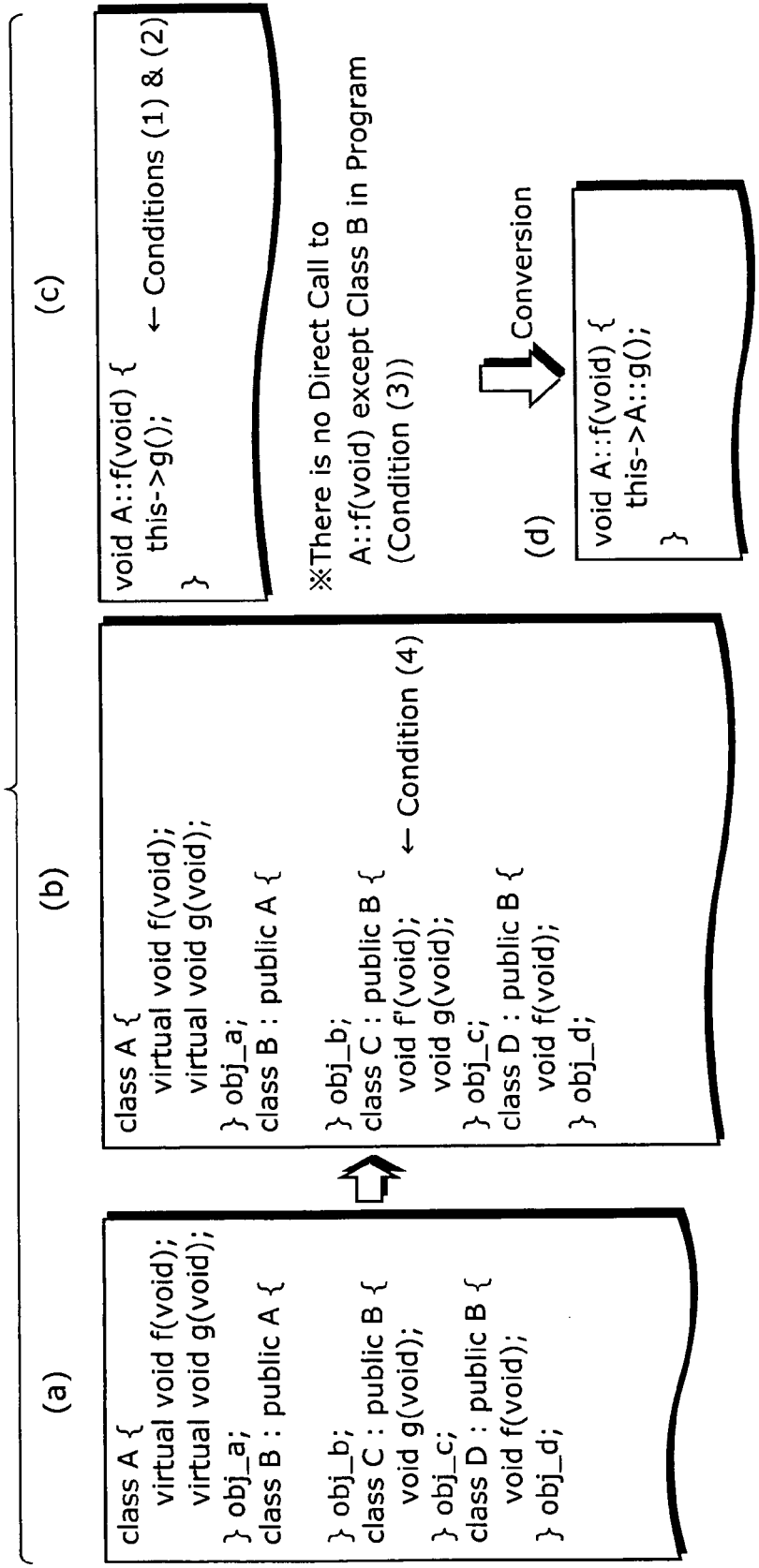
FIG. 52 is a schematic diagram explaining processing which is performed by a program converting apparatus according to the fifth embodiment of the present invention.

FIG. 52 is a schematic diagram explaining processing which is performed, based on the above-mentioned four conditions, by a program converting apparatus according to the fifth embodiment. Here, it is assumed that classes are defined as shown in (a) of FIG. 52, and a program is described as shown in (c) of FIG. 52.

In a case where a virtual function g is regarded as the virtual function F1, and a virtual function f is regarded as the virtual function F2, a statement "this->g( )" in (c) of FIG. 52 satisfies the conditions (1) and (2). More specifically, the virtual function F1 (virtual function g) is described in a definition of the virtual function F2 (virtual function f), which satisfies the condition (1). In addition, the virtual function F1 (virtual function g) is called by the pointer "this", which satisfies the condition (2).

Further, regarding the condition (3), there is no direct call to A::f(void) in the classes except Class B, in the program. This means that the virtual function F2 (virtual function f) is not directly called by objects in a class (class C) that are one of derived classes (classes B, C, and D) of the class C1 (class A) to which the virtual function F2 (virtual function f) belongs, and that are not the class C2 (classes B and D) in which the virtual function F1 (virtual function g) is re-defined. Accordingly, this satisfies the condition (3).

In addition, all virtual functions F2 (virtual functions f) which are not re-defined in the derived class (class C) except the class C2 (classes B and D) are duplicated. More specifically, as shown in (b) of FIG. 52, the virtual function f is duplicated in the class C. Therefore, this satisfies the condition (4).

Accordingly, in the above case, it is possible to convert a call to the virtual function g as shown in (c) of FIG. 52 into a direct call to the virtual function g in the class A as shown in (d) of FIG. 52.

The following describes processing which is performed by the program converting apparatus 200 according to the fifth embodiment with reference to examples of the program.

Firstly, the input unit 102 inputs all programs 111 from the program storage unit 101 (S102), and the syntax analysis unit 103 creates syntax trees or symbol tables of the respective programs 111 (S103).

Next, the class inheritance relationship analysis unit 104 analyzes the classes included in the respective programs and inheritance relationships among the classes, and stores results of the analysis into the class inheritance relationship information 113 (S104). The class inheritance relationship analysis processing (S104) is the same processing as shown in FIG.

12. FIG. 53 shows the class inheritance relationship information 113 which is the results of analyzing the programs 111 of FIG. 30 by the class inheritance relationship analysis processing (S104).

Next, the virtual function re-definition analysis unit 105 analyzes status of re-definitions of virtual functions in the respective base classes, and stores results of the analysis into the virtual function re-definition information 114 (S105). The virtual function re-definition analysis processing (S105) is the same processing as shown in FIG. 15. FIG. 54 shows the virtual function re-definition information 114 which is the results of analyzing the programs 111 of FIG. 30 by the virtual function re-definition analysis processing (S105).

Next, the virtual function direct call analysis unit 107 analyzes virtual functions which are directly called, and stores results of the analysis into the virtual function direct call information 115 (S107). The virtual function direct call analysis processing (S107) is the same processing as shown in FIG. 17. FIG. 55 shows the virtual function direct call information 115 which is the results of analyzing the programs 111 of FIG. 30 by the virtual function direct call analysis processing (S107).

Figure 56:
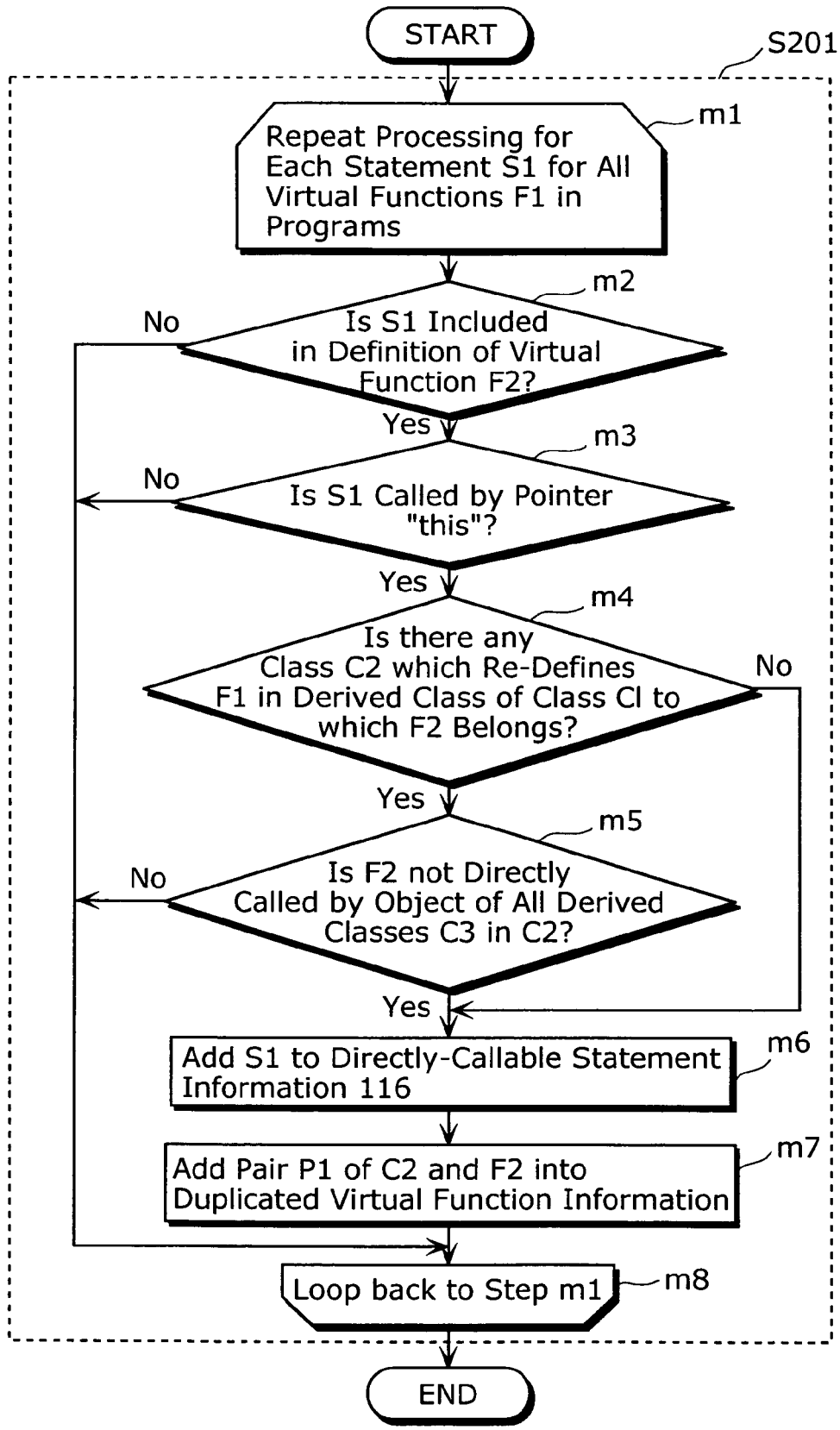
FIG. 56 is a flowchart of virtual function call conversion examination processing (S201) according to the fifth embodiment of the present invention.

Next, virtual function call conversion examination processing (S201) which is performed by the virtual function call conversion examination unit 201 in a case where the examination is made for the program 111 shown in FIG. 30 is described in more detail with reference to FIG. 56.

The virtual function call conversion examination processing (S201) which is performed by the virtual function call conversion examination unit 201 includes Steps m1 to m8. The following describes the virtual function call conversion examination processing (S201) in the step order.

At Step m1, the virtual function call conversion examination unit 201 repeats the following processing for all statements S1 which include virtual function calls in the respective programs 111. In FIG. 30, "this->g( );", "this->h( );", and the like are the statements to be examined.

At Step m2, the virtual function call conversion examination unit 201 examines whether or not the statement S1 is included in a definition of the virtual function F2. If the statement S1 is included in the definition of the virtual function F2, then the processing proceeds to Step m3, and if not, then the processing skips directly to Step m8. The statement "this->g( );" in FIG. 30 is included in a virtual function "A::f", so that a determination at Step m2 is "Yes" and the processing proceeds to Step m3. In the same manner, the statement "this->h( );" is included in a virtual function "B::g", so that the determination at Step m2 is "Yes" and the processing proceeds to Step m3. On the other hand, a statement "obj_c.g( );" is included in a function t, but the function t is not a virtual function, so that the determination at Step m2 is "No" and the processing skips directly to Step m8.

At Step m3, the virtual function call conversion examination unit 201 examines whether or not the statement S1 is called by a pointer "this". If the statement S1 is called by the pointer "this", then the processing proceeds to Step m4, and if not, then the processing skips directly to Step m8. In the statements "this->g( );" and "this->h( );" in FIG. 30, the virtual functions g and h are called by the pointer "this", so that a determination at Step m3 is "Yes" and the processing proceeds to Step m4.

At Step m4, the virtual function call conversion examination unit 201 examines whether or not there is, among all derived classes of the class C1 to which the virtual function F2 belongs, a class C2 in which the virtual function F1 is re-defined. If there is such a class C2 in which the virtual function F1 is re-defined, then the processing proceeds to Step m5, and if not, then the processing skips directly to Step m6. In FIG. 30, with reference to the virtual function re-definition information 114, it is understood that, from the derived classes B, C, and D of the class A to which the virtual function "A::f" belongs, the class B is specified as the class in which the virtual function g is re-defined. Therefore, a determination at Step m4 is "Yes" and the processing proceeds to Step m5. Furthermore, among the derived classes C and D of the class B to which the virtual function "B::g" belongs, the class D is specified as the class in which the virtual function h is re-defined, so that the determination at Step m4 is "Yes" and the processing proceeds to Step m5.

At Step m5, the virtual function call conversion examination unit 201 examines whether or not the virtual function F2 is directly called by objects in all derived classes C3 of the class C2. If the virtual function F2 is directly called, then the processing skips directly to Step m8, and if not, then the processing proceeds to Step m6. In the program 111 of FIG. 30, with reference to the virtual function direct call information 115, it is understood that the virtual function "A::f" is not directly called in objects of all derived classes C and D of the class B, so that a determination at Step m5 is "Yes" and the processing proceeds to Step m6. Furthermore, since the class D does not have any derived classes, the virtual function "B::g" is not directly called by objects of any derived classes, so that the determination at Step m5 is "Yes".

At Step m6, the virtual function call conversion examination unit 201 adds the statement S1 into the directly-callable statement information 116. In FIG. 30, the statements "this->g( );" and "this->h( )" are added to the directly-callable statement information 116.

At Step m7, the virtual function call conversion examination unit 201 adds a pair P1 of the class C2 and the virtual function F2, into the duplicated virtual function information. In FIG. 30, a pair of the class B and "A::f", and a pair of the class D and "B::g" are added to the duplicated virtual function information.

At Step m8, in the virtual function call conversion examination unit 201, the processing loops back to Step m1 in order to repeat the above steps for other statements.

Figures 57, 58:
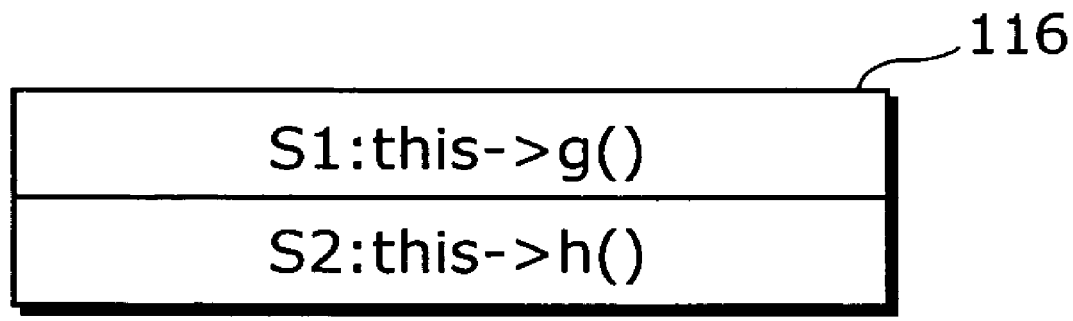
FIG. 57 is a diagram showing direct call possible statement information 116 according to the fifth embodiment of the present invention.
FIG. 58 is a diagram showing duplicated virtual function information according to the fifth embodiment of the present invention.

FIGS. 57 and 58 show the directly-callable statement information 116 and the duplicated virtual function information, respectively, which are the results of analyzing the program 111 of FIG. 30 in the virtual function call conversion examination processing (S201).

Next, the virtual function definition duplication unit 202 duplicates the definition of the virtual function if necessary, and converts the class definition and the virtual function table (S202). The virtual function definition duplication processing (S202) is the same processing as shown in FIG. 48. FIGS. 59 and 60 show a program and virtual function tables of the respective classes, respectively, which are generated by converting the program 111 of FIG. 30 in the virtual function definition duplication processing (S202).

Next, virtual function call conversion unit 203 converts the virtual function call into the direct function call (S203). The virtual function call conversion processing (S203) is the same processing as shown in FIG. 39. FIG. 61 shows codes which are generated by converting the program 111 of FIG. 13 by the virtual function call conversion processing (S203).

As described above, by inputting the program 111 shown in FIG. 30 into the program converting apparatus 200 according to the fifth embodiment, it is possible to convert the statements "this->g( );" and "this->h( );" into direct calls to the functions. Thereby, it is possible to increase an execution speed during execution of the object program 112. Note also that the program converting apparatus 200 duplicates minimum virtual functions which need to execute a program, so that it is at least possible to reduce an enlargement of a size of the code of the object program 112.

Note that the above embodiment has described that the class inheritance relationship analysis processing (S104), the virtual function re-definition analysis processing (S105), the virtual function direct call analysis processing (S107), the virtual function call conversion examination processing (S201), the virtual function definition duplication processing (S202), and the virtual function call conversion processing (S203) are performed only once respectively, but it is possible to perform these processing for a plurality of times, if necessary.

Note also that it has been described that a type of the pointer "this" can be specified by the definition of the virtual function, when the virtual function and the class to which the virtual function belongs satisfy the specific conditions. However, in a constructor which generates class objects or a destructor which deletes the class objects, the pointer "this" can be specified to a class to which the constructor or the destructor belong. Therefore, it is possible to convert a virtual function call which is pointed by the pointer "this" described in the constructor or the destructor, into a direct function call.

Note also that, in a case where the type of the pointer "this" can be specified by characteristics of the program or by execution results of the program, it is possible to convert the virtual function call into the direct function call, based on a pragma directive, an option designation, execution history information, or the like.

Sixth Embodiment

Although the program converting apparatus 100 according to the first embodiment sequentially inputs all programs 111 and then performs the processing for all programs 111 together, a program converting apparatus according to the sixth embodiment inputs the programs into separate files, and then performs the program converting processing separately for respective files.

Figure 62:
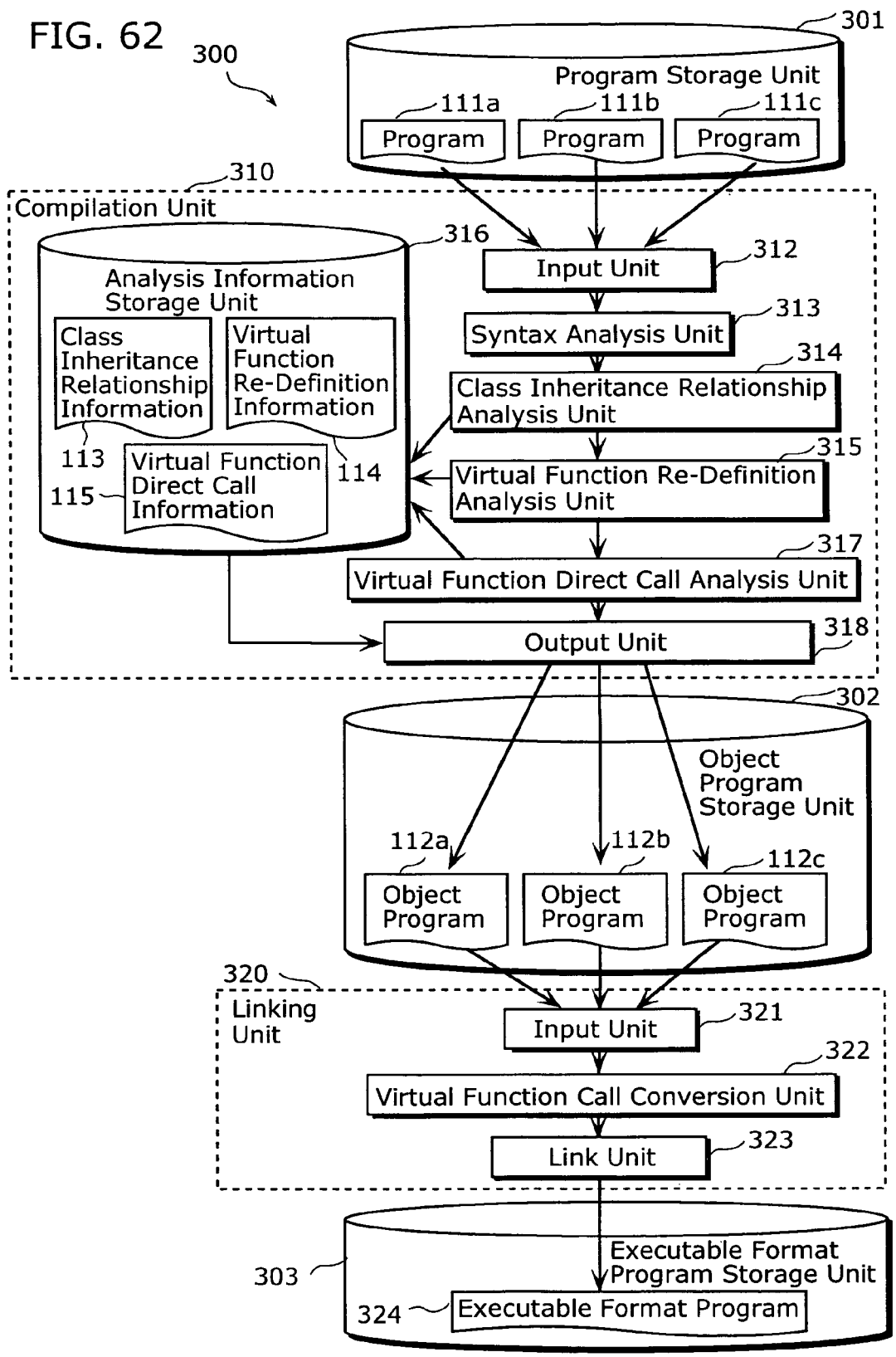
FIG. 62 is a block diagram showing a structure of a program converting apparatus according to the sixth embodiment of the present invention.

FIG. 62 is a diagram showing a structure of a program converting apparatus 300 according to the sixth embodiment of the present invention. The program converting apparatus 300 is a device which receives a plurality of programs that are described in the object-oriented C++ language, and outputs an executable format program. The program converting apparatus 100 includes a program storage unit 301, a compilation unit 310, an object program storage unit 302, a linking unit 320, and an executable format program storage unit 303.

The program storage unit 301 is a storage device which stores a plurality of programs 111a to 111c that are described in the object-oriented C++ language and are to be converted by the program converting apparatus 300.

The compilation unit 310 is a processing unit which compiles the plurality of programs 111a to 111c into a plurality of object programs 112a to 112c. The compilation unit includes an input unit 312, a syntax analysis unit 313, a class inheritance relationship analysis unit 314, a virtual function re-definition analysis unit 315, a virtual function direct call analysis unit 317, and an output unit 318.

The object program storage unit 302 is a storage device which stores the object programs 112a to 112c that correspond respectively to the programs 111a to 111c stored in the program storage unit 301.

The linking unit 320 is a processing unit which generates one executable format program 324 from the plurality of object programs 112a to 112c stored in the object program storage unit 302. The linking unit 320 includes an input unit 321, a virtual function call conversion unit 322, and a link unit 323.

The executable format program storage unit 303 is a storage device which stores the executable format program 324 outputted from the link unit 323 in the linking unit 320.

Other processing units will be described further below, when processing performed by the program converting apparatus 300 is described.

Figure 63:
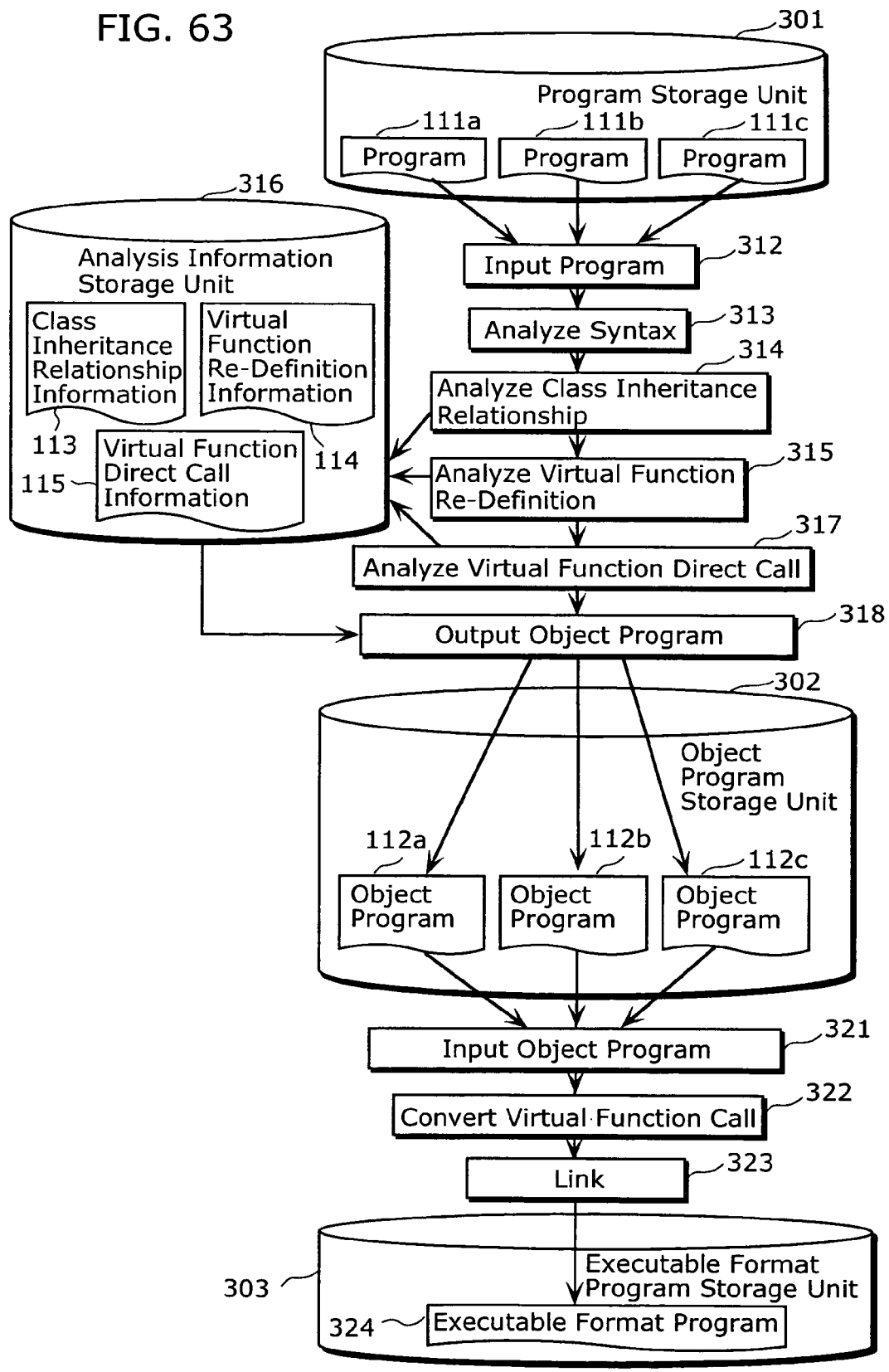
FIG. 63 is a flowchart of processing which is performed by the program converting apparatus according to the sixth embodiment of the present invention.

FIG. 63 is a flowchart of processing which is performed by the program converting apparatus 300.

The input unit 312 selects one file (one program) from the programs 111a to 111c which are stored in the program storage unit 301, and outputs the file into the syntax analysis unit 313 (S312). Note that the input unit 312 outputs a next file to the syntax analysis unit 313, every time the compilation unit 310 completes compiling one file.

The syntax analysis unit 313 analyzes a syntax of the program that has been received from the input unit 312, creates a symbol table or a syntax tree regarding the program, and outputs a result of the analysis into the class inheritance relationship analysis unit 314 (S313).

The class inheritance relationship analysis unit 314 extracts all classes included in the program, analyzes an inheritance relationship among the classes, and stores a result of the analysis, as the class inheritance relationship information 113, into the analysis information storage unit 316 (S314).

The virtual function re-definition analysis unit 315 analyzes whether or not virtual functions in the respective classes are re-definitions of virtual functions of respective base classes of those classes, and stores results of the analysis, as virtual function re-definition information 114, into the analysis information storage unit 316 (S315).

The virtual function direct call analysis unit 317 analyzes virtual functions directly called in the program and invoked objects, and stores results of the analysis, as the virtual function direct call information 115, into the analysis information storage unit 316 (S315).

The output unit 318 stores conversion results which is obtained by the virtual function direct call analysis unit 317 and analysis results which is stored in the analysis information storage unit 316, into the object program storage unit 302, as object programs (S318).

The input unit 321 receives all object programs 112a to 112c which are stored in the object program storage unit 302, and outputs the object programs into the virtual function call conversion unit 322 (S321).

The virtual function call conversion unit 322 refers to the class inheritance relationship information 113, the virtual function re-definition information 114, and the virtual function direct call information 115, which are stored in the analysis information included in the object programs 112a to 112c that have been received from the input unit 321, then determines whether or not virtual function calls in the programs can be converted into respective direct function calls, and if the virtual function calls can be converted, then converts the virtual function calls into the direct function calls (S322).

The link unit 323 generates an executable format program 324 by linking all object programs which have been converted by the virtual function call conversion unit 322, and stores the generated executable format program 324 into the executable format program storage unit 303 (S323).

Note that syntax analysis processing (S313), class inheritance relationship analysis processing (S314), virtual function re-definition analysis processing (S315), virtual function direct call analysis processing (S317), and virtual function call conversion processing (S322) are the same processing as the syntax analysis processing (S103), the class inheritance relationship analysis processing (S104), the virtual function re-definition analysis processing (S105), the virtual function direct call analysis processing (S107), and the virtual function call conversion processing (S108) in the first embodiment, respectively.

Accordingly, in the same manner as described for the program converting apparatus 100 of the first embodiment, by inputting the grogram 111 shown in FIG. 13 into the program converting apparatus 300, it is possible to convert a code of the virtual function call into a code as shown in FIG. 20. Thereby, it is possible to increase an execution speed during execution of the executable format program 324.

Note that, if the second, third, fourth, and fifth embodiments have the same structure as the sixth embodiment, those embodiments can obtain the same conversion results as described in the sixth embodiment.

Seventh Embodiment

Although the program converting apparatus 100 according to the first embodiment performs, at the same time, the processing of gathering the analysis information and the processing of converting the virtual function call, the program converting apparatus can perform those processing separately. A program converting apparatus according to the seventh embodiment is characterized in that the processing of gathering the analysis information and the processing of converting the virtual function call are performed separately.

Figure 64:
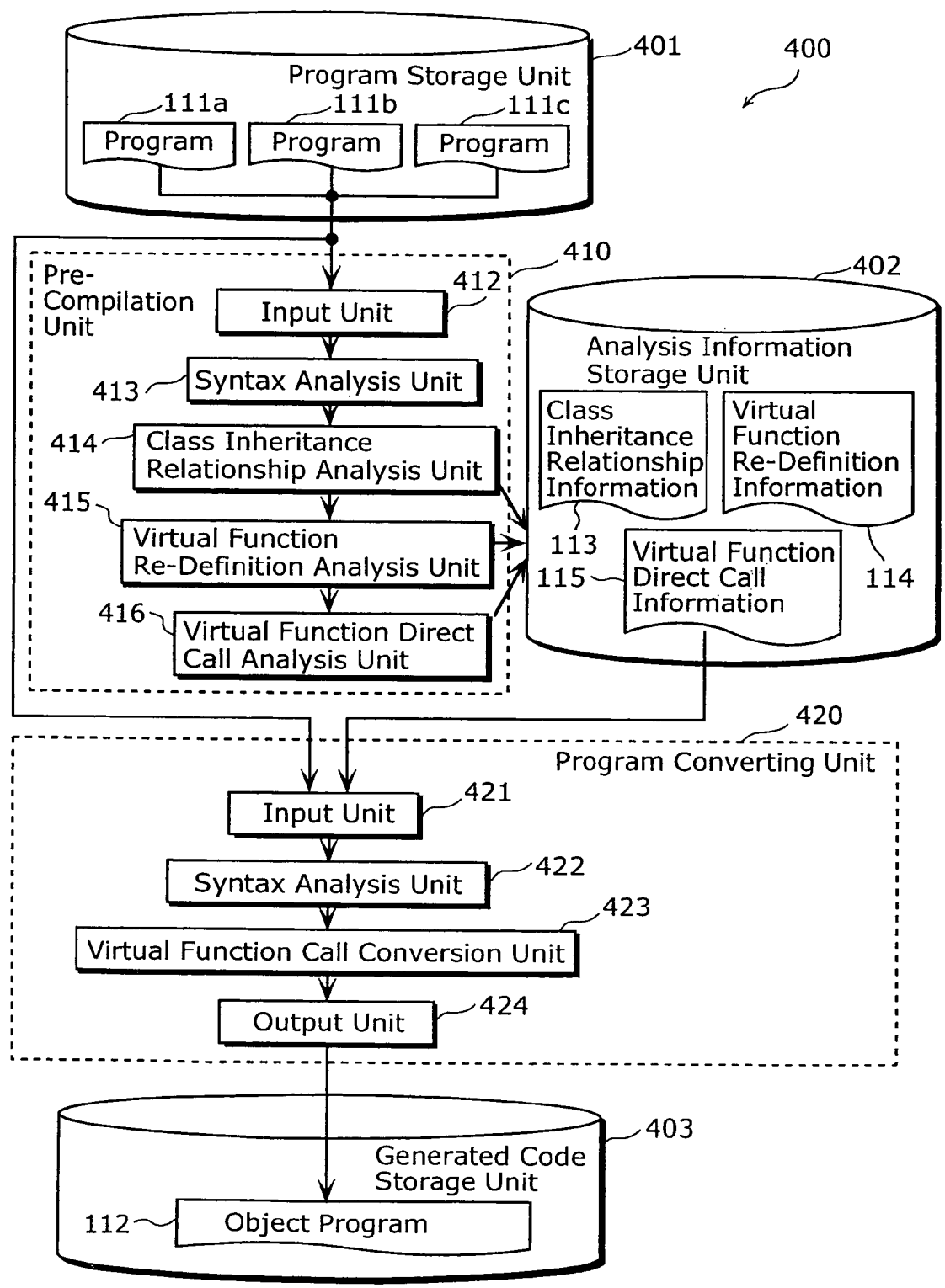
FIG. 64 is a block diagram showing a structure of a program converting apparatus according to the seventh embodiment of the present invention.

FIG. 64 is a diagram showing a structure of a program converting apparatus 400 according to the seventh embodiment of the present invention. The program converting apparatus 400 is a device which receives a plurality of programs that are described in the object-oriented C++ language, and outputs an object program. The program converting apparatus 400 includes a program storage unit 401, a pre-compilation unit 410, an analysis information storage unit 402, a program converting unit 420, and a generated code storage unit 403.

The program storage unit 401 is a storage device which stores, into separate files, a plurality of programs 111a to 111c that are described in the object-oriented C++ language and are to be converted by the program converting apparatus 400.

The pre-compilation unit 410 is a processing unit which sequentially receives all programs 111a to 111c stored in the program storage unit 401 and generates respective analysis information (the class inheritance relationship information 113, the virtual function re-definition information 114, and the virtual function direct call information 115). The pre-compilation unit 410 includes an input unit 412, a syntax analysis unit 413, a class inheritance relationship analysis unit 414, a virtual function re-definition analysis unit 415, and a virtual function direct call analysis unit 416.

The program converting unit 420 refers to the class inheritance relationship information 113, the virtual function re-definition information 114, and the virtual function direct call information 115, which are stored in the analysis information storage unit 402, then determines whether or not virtual function calls in the programs 111a to 111c can be converted into respective direct function calls, and if the virtual function calls can be converted, converts the virtual function calls into the direct function calls. The program converting unit 420 includes an input unit 421, a syntax analysis unit 422, a virtual function call conversion unit 423, and an output unit 424.

The generated code storage unit 403 is a storage device which stores the object program 112 outputted from the program converting unit 420.

Other processing units will be described further below, when processing performed by the program converting apparatus 400 is described.

Figure 65:
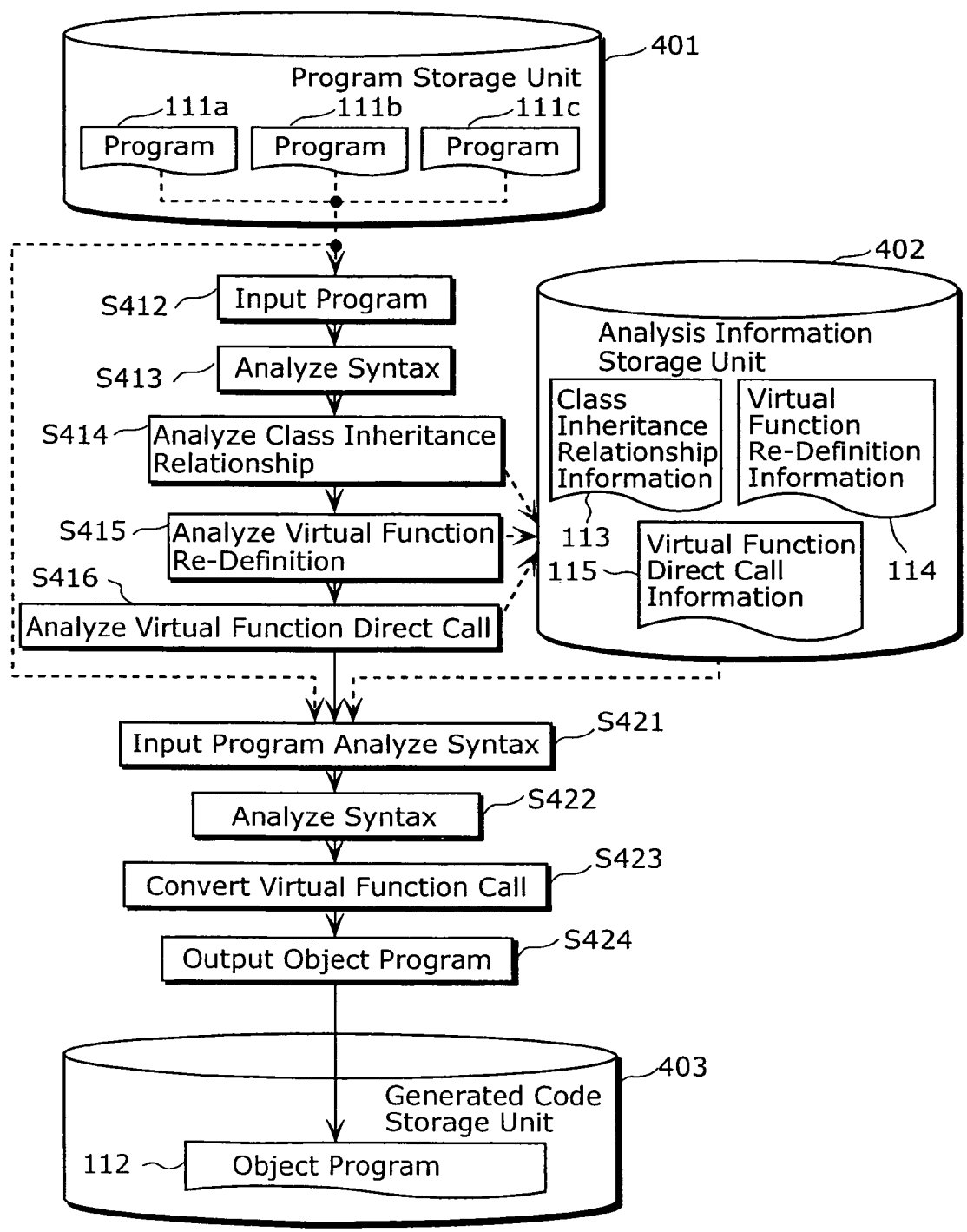
FIG. 65 is a flowchart of processing which is performed by the program converting apparatus according to the seventh embodiment of the present invention.

FIG. 65 is a flowchart of processing which is performed by the program converting apparatus 400.

The input unit 412 sequentially inputs all programs 111a to 111c which are stored in the program storage unit 401, and outputs the programs into the syntax analysis unit 413 (S412).

The syntax analysis unit 413 analyzes syntaxes of the programs 111a to 111c that have been received from the input unit 412, creates symbol tables or syntax trees regarding the respective programs, and outputs results of the analysis into the class inheritance relationship analysis unit 414 (S413).

The class inheritance relationship analysis unit 414 extracts all classes included in the programs 111a to 111c, analyzes inheritance relationships among the classes, and stores results of the analysis, as the class inheritance relationship information 113, into the analysis information storage unit 402 (S414).

The virtual function re-definition analysis unit 415 analyzes whether or not virtual functions in the respective classes are re-definitions of virtual functions of respective base classes of those classes, and stores results of the analysis, as the virtual function re-definition information 114, into the analysis information storage unit 402 (S415).

The virtual function direct call analysis unit 416 analyzes virtual functions directly called in the programs 111a to 111c, and invoked objects, and then stores results of the analysis, as the virtual function direct call information 115, into the analysis information storage unit 402 (S416).

The output unit 421 sequentially inputs the class inheritance relationship information 113, the virtual function re-definition information 114, and the virtual function direct call information 115, which are stored in the analysis information storage unit 402, and the programs 111a to 111c which are stored in the program storage unit 401, and then outputs those information and programs into the syntax analysis unit 422 (S421).

The syntax analysis unit 422 analyzes syntaxes of the programs 111a to 111c that have been received from the input unit 421, creates symbol tables or syntax trees regarding the programs, and outputs results of the analysis into the virtual function call conversion unit 423 (S422). Furthermore, the syntax analysis unit 422 outputs the class inheritance relationship information 113, the virtual function re-definition information 114, and the virtual function direct call information 115, into the virtual function call conversion unit 423.

The virtual function call conversion unit 423 refers to the class inheritance relationship information 113, the virtual function re-definition information 114, and the virtual function direct call information 115, which have been received from the syntax analysis unit 422, then determines whether or not virtual function calls in the classes of the programs can be converted into respective direct function calls, and if the virtual function calls can be converted, converts the virtual function calls into the direct function calls (S423).

The output unit 424 stores, as the object program 112, the program which has been converted at each step, into the generated code storage unit 403 (via S424).

Note that syntax analysis processing (S413 and S422), class inheritance relationship analysis processing (S414), virtual function re-definition analysis processing (S415), virtual function direct call analysis processing (S416), and virtual function call conversion processing (S423) are the same processing as the syntax analysis processing (S103), the class inheritance relationship analysis processing (S104), the virtual function re-definition analysis processing (S105), the virtual function direct call analysis processing (S107), and the virtual function call conversion processing (S108) in the first embodiment, respectively.

Accordingly, in the same manner as described for the program converting apparatus 100 of the first embodiment, by inputting the program 111 shown in FIG. 13 into the program converting apparatus 400, it is possible to convert a code of the virtual function call into a code as shown in FIG. 20. Thereby, it is possible to increase an execution speed during execution of the object program 112.

Note that, if the second, third, fourth, and fifth embodiments have the same structure as the seventh embodiment, those embodiments can obtain the same conversion results as described in the seventh embodiment.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

INDUSTRIAL APPLICABILITY

The present invention can be applied to a compiler, and especially to a compiler and the like which convert a program described in an object-oriented language.

What is claimed is:

1. A program converting method for converting a program described in an object-oriented language, said method comprising:
    analyzing, in the program stored in a program storage of a program converting apparatus, a type of an instance by which a method is called;
    extracting, from a definition of the method, a virtual method call which is called by the instance; and
    converting, based on the type of the instance analyzed by said analyzing, the virtual method call extracted by said extracting, into a direct method call,
    wherein said analyzing includes:
    analyzing, in the program, an inheritance relationship of classes;
    analyzing a re-definition of a virtual method corresponding to the virtual method call in each of the classes;
    analyzing, in the program, the direct method call to the virtual method; and
    specifying, based on a result of said analyzing of the inheritance relationship of the classes, said analyzing of the re-definition, and said analyzing of the direct method call, the type of the instance by which the method is called, and
    in said converting, the virtual method call extracted by said extracting is converted into the direct method call, when the type of the instance is specifiable by said specifying.

2. The program converting method according to claim 1, wherein said specifying includes:
    determining whether a class to which the method belongs has a derived class;
    determining, when the class has the derived class, whether the method is re-defined in every derived class which directly inherits the class; and
    determining whether the method is directly called by the instance, the instance existing in every derived class of the class.

3. The program converting method according to claim 1, wherein said specifying includes:
    determining whether a class to which the method belongs has a derived class;
    determining, when the class has the derived class, whether the method is re-defined in a second class in which the virtual method extracted by said extracting is re-defined; and
    determining whether the method is directly called by the instance, the instance existing in the second class and every derived class of the second class.

4. The program converting method according to claim 1, wherein in said analyzing of the type of the instance, the type of the instance by which the method is called is specified, when the method is a method for generating the instance.

5. The program converting method according to claim 1, wherein in said analyzing of the type of the instance, the type of the instance by which the method is called is specified, when the method is a method for deleting the instance.

6. A program converting method for converting a program described in an object-oriented language, said method comprising:
    analyzing, in the program stored in a program storage of a program converting apparatus, a type of an instance by which a method is called;
    extracting, from a definition of the method, a virtual method call which is called by the instance;
    duplicating a virtual method, based on the type of the instance analyzed by said analyzing; and
    converting, based on the type of the instance analyzed by said analyzing, the virtual method call extracted by said extracting into a direct method call,
    wherein said analyzing includes:
    analyzing, in the program, an inheritance relationship of classes;
    analyzing a re-definition of the virtual method in each class;
    analyzing, in the program, a direct call to the virtual method; and
    specifying, based on results of said analyzing of the inheritance relationship of the classes, said analyzing of the re-definition, and said analyzing of the direct call, the type of the instance by which the method is called, and
    in said converting, the virtual method call extracted by said extracting is converted into the direct method call, when the type of the instance is specifiable by said specifying.

7. The program converting method according to claim 6, wherein said specifying includes:
    determining whether a class to which the method belongs has a derived class;
    determining whether the method is directly called by the instance, the instance existing in every derived class of the class, and
    in said duplicating, for each class included in the program, when the class has a base class, a virtual method which is included in the base class and not re-defined in the class is re-defined in the class.

8. The program converting method according to claim 6, wherein said specifying includes:
    determining whether a class to which the method belongs has a derived class; and
    determining whether the method is directly called by the instance, the instance existing in every derived class of the class, and
    in said duplicating, for each second class of a plurality of second classes which directly inherits the class to which the method belongs, when the method is not re-defined in a second class of the plurality of second classes, the method is re-defined in the second class.

9. The program converting method according to claim 6, wherein said specifying includes:
- determining whether a class to which the method belongs has a derived class;
- extracting, when the class has the derived class, a third class in which the virtual method extracted by said extracting of the virtual method is to be re-defined; and
- determining whether the method is directly called by the instance, the instance existing in the third class and every derived class of the third class, and
- in said duplicating, when the method is not re-defined in the third class, the method is re-defined in the third class.

10. A program converting method for converting a program described in an object-oriented language, said method comprising:
- compiling the program stored in a program storage of a program converting apparatus; and
- linking a result of said compiling,
- wherein said compiling includes:
- analyzing, in the program, a type of an instance by which a method is called;
- extracting, from a definition of the method, a virtual method call which is called by the instance; and
- outputting results of said analyzing and said extracting,
- wherein said linking includes:
- inputting an output of said compiling and extracting an analysis result included in the output;
- converting, based on a result of said extracting of the analysis result, the virtual method call into a direct method call; and
- linking results of said converting to each other,
- wherein said analyzing includes:
- analyzing, in the program, an inheritance relationship of classes;
- analyzing a re-definition of a virtual method corresponding to the virtual method call in each of the classes;
- analyzing, in the program, the direct method call to the virtual method; and
- specifying, based on a result of said analyzing of the inheritance relationship of the classes, said analyzing of the re-definition, and said analyzing of the direct method call, the type of the instance by which the method is called, and
- in said converting, the virtual method call extracted by said extracting is converted into the direct method call, when the type of the instance is specifiable by said specifying.

11. A program converting method for converting a program described in an object-oriented language, said method comprising:
- extracting predetermined information from the program stored in a program storage of a program converting apparatus; and
- converting, based on a result of said extracting, a virtual method call into a direct method call,
- wherein said extracting includes:
- analyzing, in the program, a type of an instance by which a method is called;
- extracting, from a definition of the method, the virtual method call which is called by the instance,
- wherein said converting includes:
- inputting by receiving the program, a result of said analyzing, and a result of said extracting of the definition of the method, as an input; and
- converting, based on the results which are inputted by said inputting, the virtual method call extracted by said extracting of the definition of the method, into the direct method call,
- wherein said analyzing includes:
- analyzing, in the program, an inheritance relationship of classes;
- analyzing a re-definition of a virtual method corresponding to the virtual method call in each of the classes;
- analyzing, in the program, the direct method call to the virtual method; and
- specifying, based on a result of said analyzing of the inheritance relationship of the classes, said analyzing of the re-definition, and said analyzing of the direct method call, the type of the instance by which the method is called, and
- in said converting, the virtual method call extracted by said extracting is converted into the direct method call, when the type of the instance is specifiable by said specifying.

* * * * *